(12) United States Patent
Beattie, Jr. et al.

(10) Patent No.: US 9,655,035 B2
(45) Date of Patent: *May 16, 2017

(54) FEMTOCELL USE FOR RADIO FREQUENCY NETWORK SWEEPS

(71) Applicant: AT&T Intellectual Property I, L.P., Atlanta, GA (US)

(72) Inventors: James Gordon Beattie, Jr., Bergenfield, NJ (US); Stephen Griesmer, Westfield, NJ (US); Thomas Killian, Brookside, NJ (US); N. L. Schryer, New Providence, NJ (US); Dipesh Hasmukhlal Shah, Fremont, CA (US); Kaushik Gohel, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/014,285

(22) Filed: Feb. 3, 2016

(65) Prior Publication Data

US 2016/0157167 A1 Jun. 2, 2016

Related U.S. Application Data

(63) Continuation of application No. 14/154,881, filed on Jan. 14, 2014, now Pat. No. 9,288,699, which is a
(Continued)

(51) Int. Cl.
*H04W 24/08* (2009.01)
*H04W 48/16* (2009.01)
(Continued)

(52) U.S. Cl.
CPC ........... *H04W 48/16* (2013.01); *H04W 24/08* (2013.01); *H04W 24/10* (2013.01); *H04W 84/045* (2013.01); *H04W 88/12* (2013.01)

(58) Field of Classification Search
CPC ........................... H04W 24/08; H04W 84/045
See application file for complete search history.

(56) References Cited

U.S. PATENT DOCUMENTS 7,954,010 B2    5/2011   Beattie, Jr. et al.
2009/0285166 A1 11/2009  Huber et al.
(Continued)

OTHER PUBLICATIONS http://www.celplan.com/Products/CP.asp?Plan=true ; 1 pages; Last accessed on Nov. 21, 2001.
(Continued)

*Primary Examiner* — Chuong A Ngo
(74) *Attorney, Agent, or Firm* — Amin, Turocy & Watson, LLP

(57) ABSTRACT

Systems and methods that utilize femtocell access points (FAP) to perform radio frequency (RF) network sweeps are provided. In one embodiment, a method includes: predicting an availability of an access point (AP) to perform an RF network sweep; and determining that the access point is available to perform the RF network sweep based, at least, on a prediction that a mobile device on a white list for the access point is not likely to access the access point during a time interval associated with performing the RF network sweep. In another embodiment, a method includes: comparing a network quality characteristic for a wireless channel associated with a FAP with a network quality characteristic for a wired network communicatively coupled to the FAP. The network quality characteristics can be the same. The method can then include employing the comparison to determine to which network an impairment is attributable.

20 Claims, 17 Drawing Sheets

Related U.S. Application Data continuation of application No. 13/312,931, filed on Dec. 6, 2011, now Pat. No. 8,660,556.

(51) Int. Cl.
*H04W 24/10* (2009.01)
*H04W 84/04* (2009.01)
*H04W 88/12* (2009.01)

(56) References Cited

U.S. PATENT DOCUMENTS

| | | |
|---|---|---|
| 2009/0319656 A1 | 12/2009 | Yang et al. |
| 2010/0029298 A1 | 2/2010 | Iwamura et al. |
| 2010/0097940 A1 | 4/2010 | Asefa et al. |
| 2010/0149989 A1 | 6/2010 | Beattie, Jr. et al. |
| 2010/0151858 A1* | 6/2010 | Brisebois ............ H04W 24/10 455/434 |
| 2010/0246544 A1 | 9/2010 | Brisebois et al. |
| 2011/0051904 A1 | 3/2011 | Triano et al. |
| 2011/0081897 A1 | 4/2011 | Beattie, Jr. et al. |
| 2011/0122768 A1 | 5/2011 | George et al. |
| 2011/0195715 A1 | 8/2011 | Wu |
| 2011/0237269 A1 | 9/2011 | Chen |
| 2013/0109379 A1* | 5/2013 | Shi ........................ H04W 48/16 455/434 |
| 2014/0222379 A1* | 8/2014 | Martinez Heras ..... G05B 23/02 702/188 |

OTHER PUBLICATIONS http://www.mentum,com/index.php?page=mentum-planet&hl=en_US; 3 pages; Last accessed on Nov. 21, 2011.
http://www.mentum.com/index.php?page=cellplanner&hl=en_US; 2 pages; Last accessed on Nov. 21, 2011.
http://www.equilateral.com/broadband.html#optimization; 2 pages; Last accessed on Nov. 21, 2001.
Office Action dated Jun. 4, 2013 for U.S. Appl. No. 13/312,931, 18 pages.
Notice of Allowance dated Oct. 15, 2013 for U.S. Appl. No. 13/312,931, 19 pages.
Office Action dated Mar. 26, 2015 for U.S. Appl. No. 14/154,881, 30 pages.
Office Action dated Aug. 18, 2015 for U.S. Appl. No. 14/154,881, 21 pages.

* cited by examiner

FEMTOCELL USE FOR RADIO FREQUENCY NETWORK SWEEPS

CROSS-REFERENCE TO RELATED APPLICATIONS

This application is a continuation of U.S. patent application Ser. No. 14/154,881, now U.S. Pat. No. 9,288,699, filed Jan. 14, 2014, and entitled "FEMTOCELL USE FOR RADIO FREQUENCY NETWORK SWEEPS," which is a continuation of U.S. patent application Ser. No. 13/312,931, filed Dec. 6, 2011, and entitled "FEMTOCELL USE FOR RADIO FREQUENCY NETWORK SWEEPS," which applications are hereby incorporated herein by reference in their respective entireties.

TECHNICAL FIELD

The disclosure relates to wireless communications and, more particularly, to systems and methods utilizing femtocell access points for radio frequency network sweeps.

BACKGROUND

Wireless service providers are observing an exponential growth in mobile communications due to both an increase in consumer demand and commercial requirements. Moreover, to improve customer satisfaction, wireless service providers aim to deliver a high quality service at any location to facilitate reliable and efficient mobile communications. To improve coverage and reduce dead zones, wireless service providers can typically add front-end equipment to realize effective bandwidth increases. In addition, building-based femtocell access points (FAPs), interfaced with a wired broadband network, can be deployed to improve indoor wireless coverage and/or to offload a mobility radio access network (RAN) operated by the wireless service provider.

Conventionally, radio frequency (RF) propagation tools are employed to perform sweeps of cell site coverage areas. However, such sweeps are often performed manually, at ground or street level, infrequently, with limited geographic coverage and at times or under conditions that are not representative of actual network congestion or traffic.

SUMMARY

The following presents a simplified summary of one or more of the embodiments in order to provide a basic understanding of some embodiments of the embodiments. This summary is not an extensive overview of the embodiments described herein. It is intended to neither identify key or critical elements of the embodiments nor delineate any scope particular embodiments of the embodiments or any scope of the claims. Its sole purpose is to present some concepts of the embodiments in a simplified form as a prelude to the more detailed description that is presented later. It will also be appreciated that the detailed description may include additional or alternative embodiments beyond those described in this summary.

In one embodiment, a method can include: predicting an availability of an access point (AP) to perform an RF network sweep; and determining that the access point is available to perform the radio frequency network sweep if, at least, a prediction is made that a mobile device on a white list for the access point is not likely to access the access point during a time interval associated with performing the radio frequency network sweep. In some embodiments, the AP can be an FAP.

In another embodiment, a method can include: comparing a network quality characteristic for a wireless channel associated with a femtocell access point with a network quality characteristic for a wired network communicatively coupled to the femtocell access point, the network quality characteristic for the wireless channel and the network quality characteristic for the wired network being a same network quality characteristic; and determining a network to which a performance impairment is associated based, at least, on the comparing.

In another embodiment, a system can include: a memory configured to store computer executable components; and a processor configured to execute computer executable components stored in the memory. The computer executable component can include a prediction component configured to determine whether a mobile device on a white list of an access point is actively associated with the access point. The prediction component can also be configured to determine that the access point is available to perform a radio frequency network sweep if, at least, a determination is made that the mobile device on the white list of the access point fails to be actively associated with the access point. The prediction component can also be configured to determine that the access point fails to be available to perform a radio frequency network sweep if, at least, a determination is made that the mobile device on the white list of the access point is actively associated with the access point.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

DETAILED DESCRIPTION

Figure 1:
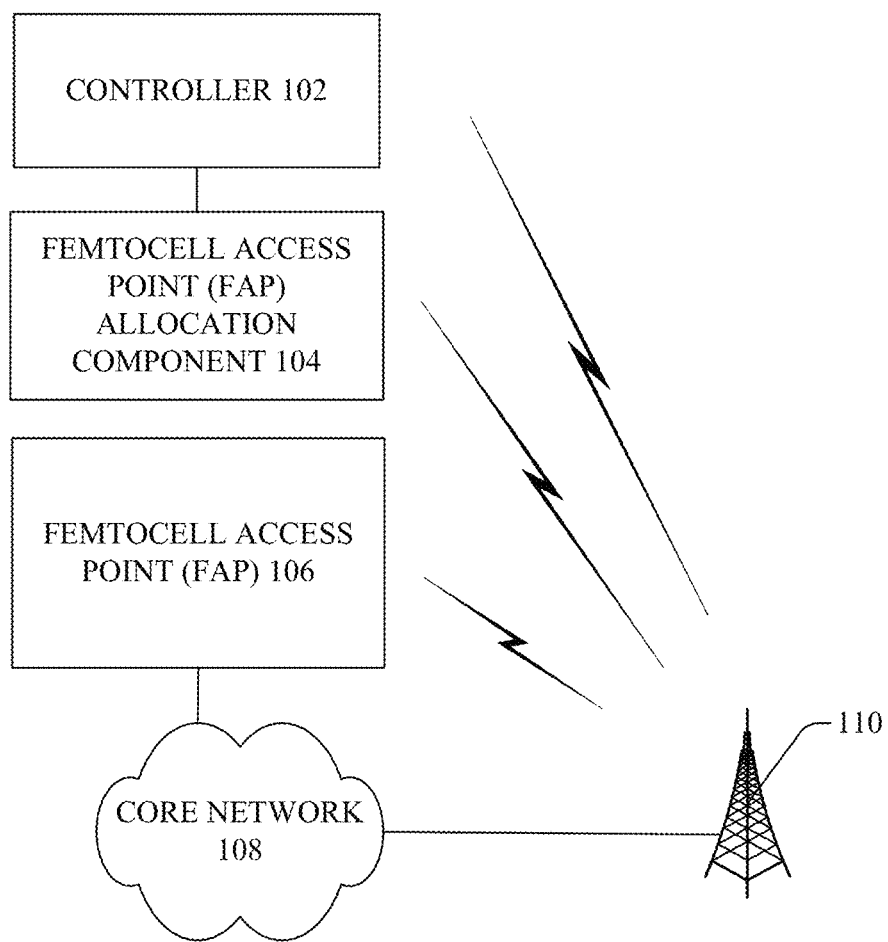
FIG. 1 illustrates an example system that facilitates utilizing an FAP for RF network sweeps.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, the terms "component," "module," "system," "interface," "platform," "service," "framework," "connector," "controller" or the like are generally intended to refer to a computer-related entity, either hardware, a combination of hardware and software, software or software in execution or an entity related to an operational machine with one or more specific functionalities. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application, and/or application programming interface (API) components.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "base station (BS)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

Systems and methods described herein relate to utilizing FAPs to perform RF network sweeps. The FAP can be employed for such sweeps if the FAP is determined to be available. The FAP is considered available to perform the network sweep when it is unlikely that a mobile device on the white list of the FAP will access the FAP. As such, systems and methods of predicting when the FAP is available are provided. In various embodiments, predictions can be made based on a number of different factors including, but not limited to, the geographic proximity of the mobile device to the FAP, whether the mobile device is using the public cell site associated with the FAP, the historical usage patterns of the mobile device and/or whether the mobile device is likely to enter a geographical region defined by a time vector having a length associated with the time duration for the particular RF network sweep to be performed.

Employing FAPs for RF network sweeps can identify coverage issues, collisions and/or coverage by various different telecommunications carriers. Additionally, using the FAP can enable RF network sweeps to be performed during peak traffic hours and/or can cover areas typically unable to be monitored. Further, macrocell network managers can gain a better understanding of the conditions on the ground impacting customers as issues arise.

The systems and methods utilize prediction to improve the likelihood of non-intrusive and non-disruptive use of the FAP for RF network sweeps. Accordingly, conflicts with E911 and the personal convenience of the mobile device users can be minimized, thereby also improving quality of service.

FIG. 1 illustrates an example system that facilitates utilizing an FAP for RF network sweeps. System 100 can include a controller 102, an FAP allocation component 104, an FAP 106, a core network 108 and/or a base station (BS) 110. The controller 102, FAP allocation component 104, FAP 106, core network 108 and/or BS 110 can be electrically and/or communicatively coupled to one another to perform one or more functions of system 100.

The FAP allocation component 104 can predict whether the FAP 106 is available for use to perform an RF network sweep. One or more methods for prediction can be employed by the FAP allocation component 104 to evaluate whether the FAP 106 can be utilized without being intrusive and/or disruptive to the operations between the FAP 106 and the one or more mobile devices on the white list of the FAP 106. As such, the FAP allocation component 104 can determine a likelihood of the one or more mobile devices attempting to access, or accessing, the FAP 106 while the FAP 106 is being used as an RF network probe. If the FAP allocation component 104 predicts that the FAP 106 is available for use as an RF network probe, in some embodiments, the FAP allocation component 104 can send information to the controller 102.

The controller 102 can be configured to receive information from and transmit information to the FAP allocation component 104 and the FAP 106. For example, the controller 102 can be configured to receive information indicating that the FAP allocation component 104 predicts that the FAP 106 is available for use in performing an RF network sweep, and can transmit a command to the FAP 106 commanding the FAP 106 to perform the RF network sweep.

By way of example, the controller 102 can be configured to authorize use of the FAP 106 for performing the RF network sweep during a selected time interval corresponding to the time interval for the RF network sweep. Similarly, the controller 102 can be configured to block use of the FAP 106 for performing the RF network sweep during a selected time interval identified as a time interval during which the mobile device is likely to access the FAP 106.

In various embodiments, the controller 102 can determine the type of RF network sweep to perform and/or one or more parameters of the network sweep. The controller 102 can transmit such information to the FAP 106 to facilitate performance of the RF network sweep.

The FAP 106 can be configured to provide access point services to one or more mobile devices on the white list of the FAP 106. Additionally, the FAP 106 can be configured to perform an RF network sweep on a mobility network within a selected geographical proximity to the FAP 106. Accordingly, the FAP 106 can be configured to operate as an RF network probe for the mobility network. As such, an FAP 106, which can be located in a residence or a business location, can serve as a monitoring tool for informing a telecommunications carrier of the status of wireless network coverage in the geographic proximity of the FAP 106. Specifically, in some embodiments, the FAP 106 can be configured to provide measurement data for the wireless network. In some embodiments, the measurement data can be indicative of one or more network quality characteristics including, but not limited to, network latency, packet loss, forward error correction (FEC) delay (e.g., the time that it takes to do the proper FEC), unavailable seconds (e.g., the period of time during which there is no communication with the FAP 106) and/or a time and/or frequency associated with the FAP being unreachable.

The BS 110 can be configured to transmit and receive information between the controller 102, FAP allocation component 104, FAP 106 and/or core network 108.

The core network 108 can be or include a wired network to which the FAP 106 is communicatively coupled in some embodiments. For example, the core network 108 can include a broadband landline to which the FAP 106 is communicatively coupled. As another example, the core network 108 can be or include one or more public cell sites such as that associated with BS 110. For example, the core network 108 can include the public cell site to which a mobile device on the white list of the FAP 106 would be communicatively coupled immediately upon leaving the wireless channel associated with the FAP 106.

Figure 2:
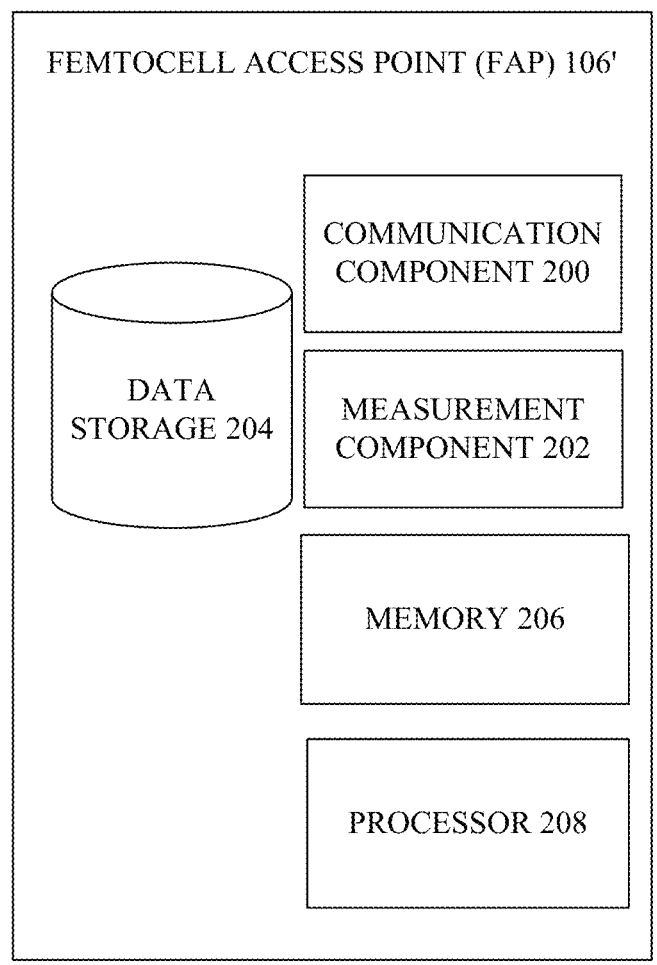
FIG. 2 illustrates an example FAP that can be employed to facilitate RF network sweeps.
Figure 3:
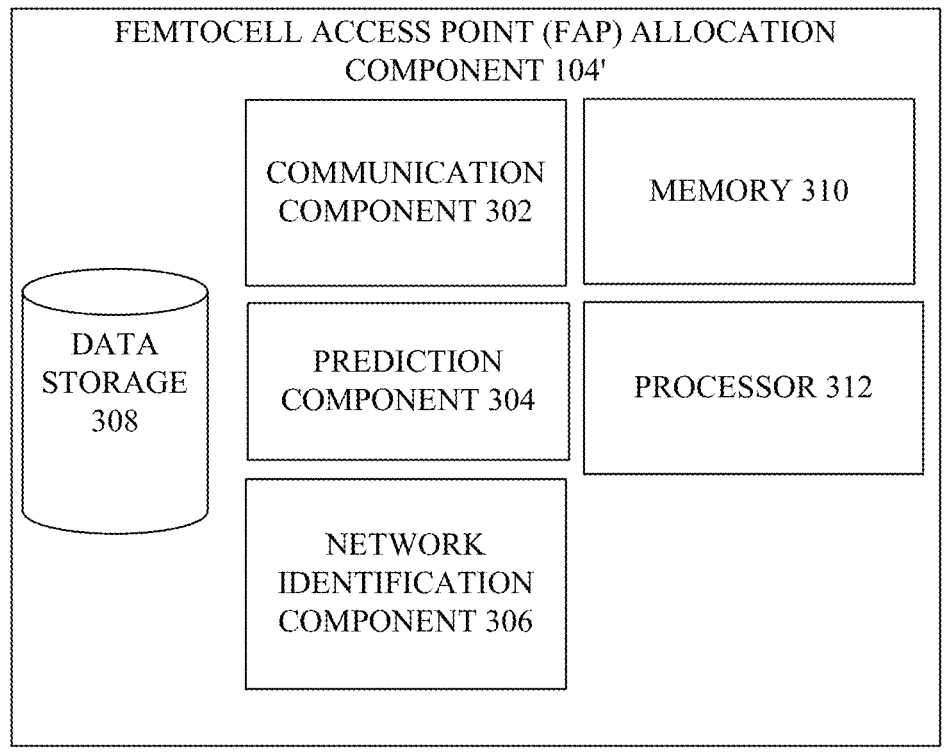
FIG. 3 illustrates an example FAP allocation component that facilitates utilizing an FAP for RF network sweeps.

The FAP 106 and FAP allocation component 104 will now be described in more detail with reference to the remaining figures. Turning first to FIGS. 2 and 3, FIG. 2 illustrates an example FAP (e.g., FAP 106, 106') that can be employed to facilitate RF network sweeps. FIG. 3 illustrates an example FAP allocation component 104, 104' that can facilitate utilizing an FAP for RF network sweeps. The FAP 106' can include one or more of the structure and/or functionality of the FAP 106 described with reference to FIG. 1. Similarly, the FAP allocation component 104' can include one or more of the structure and/or functionality of the FAP allocation component 104' described with reference to FIG. 1.

As shown in FIG. 2, the FAP 106' can include a communication component 200, a measurement component 202, data storage 204, a memory 206 and/or a processor 208. In various embodiments, one or more of the communication component 200, measurement component 202, data storage 204, memory 206 and/or processor 208 can be electrically and/or communicatively coupled to one another to perform one or more functions described herein.

The communication component 200 can be configured to transmit and/or receive signals to and/or from mobile devices on the white list of the FAP 106'. The communication component can also be configured to transmit and/or receiving information for testing one or more network quality characteristics of the wireless channel associated with the FAP 106'. For example, the communication component can be configured to transmit and/or receive information while the FAP 106' performs an RF network sweep. The measurement component can be configured to measure the one or more network quality characteristics of the wireless channel. The measurements can be obtained during an RF network sweep by the FAP 106'.

The data storage 204 can be configured to store information transmitted to, received by and/or processed by the FAP 106'. In some embodiments, the FAP 106' can store the measurement information obtained during the RF network sweep. In various embodiments, the FAP 106' can be configured to store a white list identifying one or more mobile devices permitted to access the FAP 106'.

Processor 208 can perform one or more of the functions described herein with reference to the FAP 106'. The memory 206 can be a computer-readable storage medium storing computer-executable instructions and/or information for performing the functions described herein with reference to the FAP 106'.

Turning to FIG. 3, the FAP allocation component 104' can include a communication component 302, a prediction component 304, a network identification component 306, data storage 308, a memory 310 and/or a processor 312. The communication component 302, prediction component 304, network identification component 306, data storage 308, memory 310 and/or processor 312 can be electrically and/or communicatively coupled to one another to perform one or more functions described herein.

Processor 312 can perform one or more of the functions described herein with reference to the FAP allocation component 104'. The memory 212 can be a computer-readable storage medium storing computer-executable instructions and/or information for performing the functions described herein with reference to the FAP allocation component 104'.

Figure 6:
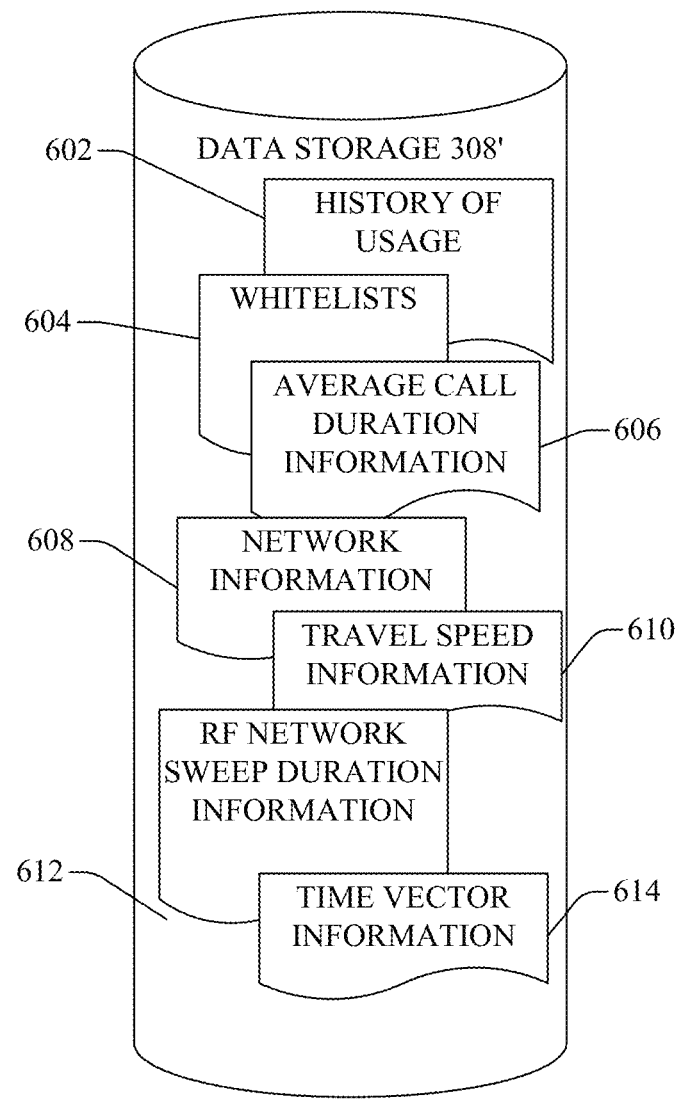
FIG. 6 illustrates an example data storage that facilitates utilizing an FAP for RF network sweeps.

The communication component 302 can be configured to transmit and/or receive signals to and/or from the controller 102, the FAP 106' and/or the BS 110. For example, the signals can be indicative of a prediction of whether the FAP 106' is available for use as an RF network probe. In some embodiments, the communication component 302 can be configured to attempt to locate the one or more mobile devices on the white list of the FAP 106' in order to generate a prediction as to the availability of the FAP 106'. FIG. 6 illustrates an embodiment of data storage 308' of the FAP allocation component 104'. With reference to FIG. 6, the communication component 302 can access the white lists 604 in the data storage 308' in order to determine the identity of the mobile devices on the white list.

Figure 4:
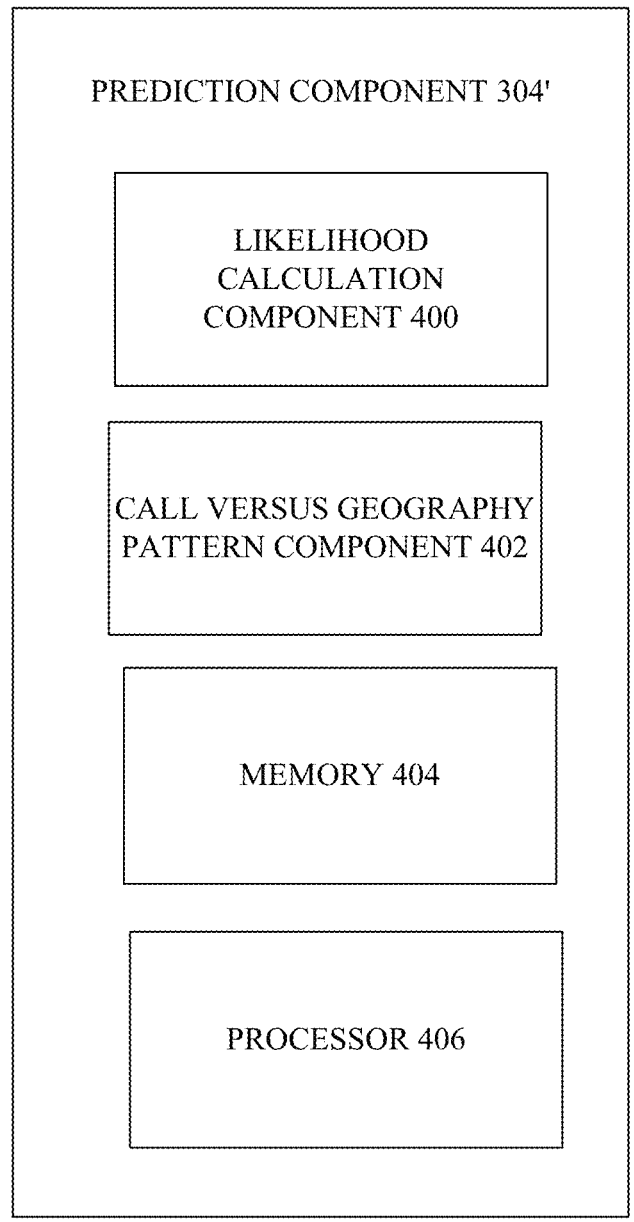
FIG. 4 illustrates an example prediction component that facilitates utilizing an FAP for RF network sweeps.

Turning back to FIG. 3, the prediction component 304 can be configured to predict whether the FAP 106' is available to perform an RF network sweep. As shown in FIG. 4, in the embodiment shown, the prediction component 304' can include a likelihood calculation component 400, a call versus geography pattern component 402, a memory 404 and/or a processor 406. The likelihood calculation component 400, call versus geography pattern component 402, memory 404 and/or processor 406 can be electrically and/or communicatively coupled to one another to perform one or more of the functions of prediction component 304' (or prediction component 304). One or more of the structure and/or the functionality described with reference to prediction component 304 can be as described with reference to prediction component 304' (and vice versa).

The likelihood calculation component 400 can be configured to compute the likelihood that an FAP 106' is available or unavailable. For example, the likelihood calculation component 400 can be configured to perform complex probability- and statistics-based operations to calculate the likelihood of the FAP 106' being available or unavailable. The calculation can be based on information detected, estimated and/or determined about the one or more mobile devices on the white list of the FAP 106', as described with reference to the systems and methods herein.

In one embodiment, the prediction component 304' can be configured to determine whether a mobile device on a white list of the FAP 106' is actively associated with the access point. The prediction component 304' can make such a determination when the communication component 302 is able to locate the mobile device.

The mobile device can be considered to be actively associated with the FAP 106' if the mobile device is currently accessing the FAP 106' (e.g., accessing the FAP 106' for an active call) and/or if the mobile device is located within a particular geographic proximity to the FAP 106' (e.g., located within a fairly close distance to the FAP 106' such as within 20 feet of the FAP 106'). If the mobile device is accessing the FAP 106' and/or close to the FAP 106', a prediction can be made that the mobile device is likely to access the FAP 106' if an RF network sweep is performed, and therefore network sweeps can be blocked on the FAP 106' during the time that the mobile device is actively associated with the FAP 106'. To the contrary, the prediction component 304 can be configured to determine that the FAP 106' is available to perform the RF network sweep based on a determination that the mobile device is not actively associated with the FAP 106'.

In some embodiments, the communication component 302 is unable to locate a mobile device on the white list for the FAP 106'. For example, the communication component 302 may be unable to locate the mobile device if the mobile device is offline and/or due to poor RF conditions.

If the communication component 302 is unable to locate the mobile device (or, in some embodiments, if the communication component 302 is unable to locate each mobile device on the white list for the FAP 106'), the prediction component 304' can perform prediction by determining the likelihood that the mobile device will pop-up in an area covered by the FAP 106', and access the FAP 106'.

For example, the prediction component can analyze the historical usage information for the mobile device. The historical usage information can be stored at 602 of data storage 308'. The historical usage information can include information such as the typical times that the mobile device accesses the FAP 106'. If the time that the RF network sweep is desired to be performed overlaps with a time that the mobile device has historically accessed the FAP 106', the FAP 106' can be blocked from usage as an RF network probe. If the time that the RF network sweep is desired does not overlap with a time that the mobile device has historically accessed the FAP 106', the FAP 106' can be authorized for usage as an RF network probe.

In some embodiments, the call versus geography pattern component 402 can aid in the prediction of the availability of the FAP 106' by utilizing a time vector approach. By way of example, but not limitation, in some embodiments, the call versus geography component 402 can identify a time vector having a length corresponding to the time to perform a particular RF network sweep. In various embodiments, time vector information can be stored in 614 of data storage 308'. The time to perform the RF network sweep can be stored as the RF network sweep duration information 612 of data storage 308'. The call versus geography pattern component 402 can be configured to identify a geographic region within which the mobile device will access the FAP 106'. The geographic region can be a function of the time vector. For example, a circular geographic region can have the time vector as a radius.

The call versus geography pattern component 402 can be also configured to determine the average call duration for the mobile device. With reference to FIG. 6, the average call duration information 606 for the mobile device can be stored in data storage 308'. The call versus geography pattern component 402 can be also configured to estimate a travel speed of the mobile device. The travel speed of the mobile device can be estimated in any number of ways including, but not limited to, estimating an average travel speed (e.g., 50 miles per hour), based on information about historical travel speed estimations (e.g., travel speed information 610) for the mobile device or, in embodiments wherein the communication component 302 can locate the mobile device, based on the speed limit in the geographical area in which the mobile device is located. As such, the determination of the likelihood can be based on the average call duration for the mobile device, the travel speed and the time duration for completion of the RF network sweep. The time duration for performing the RF network sweep can differ depending on the type of testing to be performed. Such information can be stored as the RF network sweep duration information 612 in data storage 308'.

In some embodiments, the call versus geography pattern component 402 can aid in the prediction of the availability of the FAP 106' by utilizing an analysis of whether the mobile device is currently associated with the public cell site for the FAP 106'. For example, in some embodiments, the communication component 302 is further configured to determine whether the mobile device is currently associated with a public cell site for the FAP 106'. Further, the call versus geography pattern component 402 can be configured to determine whether the mobile device is currently associated with the public cell site for the FAP 106'. If the mobile device is currently associated with the public cell site, the FAP 106' can be determined to be unavailable. To the contrary, in some embodiments, if the mobile device is associated with another public cell site, and is therefore further from the FAP 106', the FAP 106' can be determined to be available.

Figure 5:
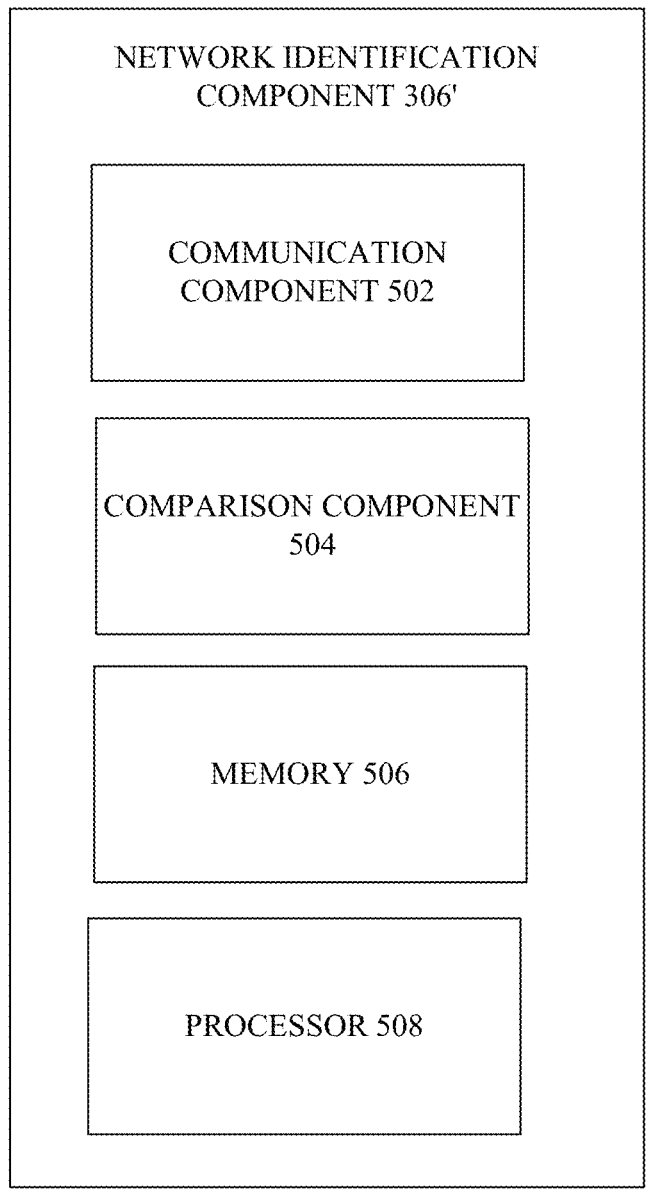
FIG. 5 illustrates an example device that facilitates determining a network to which to attribute impairments in FAP service.

FIG. 5 illustrates an example device that facilitates determining a network to which to attribute impairments in FAP service. In various embodiments, the FAP allocation component 104' can be employed to enable determination of a network to which to attribute problem conditions. For example, in some cases, an FAP (e.g., FAP 106, 106') may have a coverage problem that is not related to the RF network to which the FAP is communicatively coupled. Rather, the problem may be related to the wired network (e.g., broadband network) to which the FAP is connected.

The FAP allocation component 104' can compare the performance of the wired network and the wireless channel to delineate the root cause of impairments in the service provided by the FAP. For example, the FAP allocation component 104' can include a network identification component 306 to perform one or more functions for delineating the root cause of the impairments. The network identification component 306 can include one or more of the structure and/or functionality of network identification component 306' described with reference to FIG. 5.

Turning now to FIG. 5, in some embodiments, network identification component 306' can include a communication component 502, a comparison component 504, a memory 506 and/or a processor 508. The communication component 502, comparison component 504, memory 506 and/or processor 508 can be electrically and/or communicatively coupled to one another to perform one or more functions of the network identification component 306'.

In various embodiments, the communication component 502 can be configured to receive information indicative of a measurement of one or more network quality characteristics for the wireless channel associated with the FAP 106' and for the wired network that supports the FAP 106'. In various embodiments, with reference to FIG. 6, the information can be stored as network information 608 in the data storage 308' of the FAP allocation component 104.

The comparison component 504 can be configured to compare the network quality characteristics for the wireless channel and the wired network. The network quality characteristics can be the same for both the wireless channel and the wired network in some embodiments such that the comparison compares the same parameters. For example, the latency of the wireless channel and the wired network can be compared. In some embodiments, the network quality characteristics can be obtained for the wireless channel based on the RF network sweep performed by the FAP 106' as described herein. Accordingly, the comparison component 504 can determine whether an impairment is attributed to the wireless channel of the FAP or from the wired network.

Processor 508 can perform one or more of the functions described herein with reference to any of the systems and/or methods disclosed. The memory 506 can be a computer-readable storage medium storing computer-executable instructions and/or information for performing the functions described herein with reference to any of the systems and/or methods disclosed.

In various embodiments, system 100 can be configured as follows. The FAP allocation component 104 can be configured to perform prediction as follows. The FAP allocation component 104 can determine whether a mobile on a white list of an FAP 106 is using the FAP 106 or near the FAP 106.

If the mobile device is not near the FAP 106 (e.g., not within 10, 20 and/or 50 feet) and not using the FAP 106, the FAP allocation component 104 can be configured to transmit information to the controller 102 to control the FAP 106 to perform an RF network sweep.

In some embodiments, the FAP allocation component 104 can determine whether the mobile device is on the public cell site that the mobile device would access if the FAP 106 were not in the home or residence. By way of example, but not limitation, if the FAP 106 is at a home of a customer, the public cell site for the home of the customer can be identified and a determination can be made as to whether the mobile device is on the public cell site. If the mobile device is on such public cell site, the mobile device is in fairly close proximity to the FAP 106 and there is a high likelihood that the mobile device could attempt to access the FAP 106. In such case, the FAP allocation component 104 can determine that the FAP 106 is not available to perform the RF network sweep.

In another embodiment, prediction can be performed based on the FAP allocation component 104 determining a time vector and defining a geographic region as a function of the time vector. For example, a circle can be defined as the geographic region with the time vector as the radius (or diameter, in some embodiments) of the circle. The time vector can be lengthened or shortened depending on how long a mobile that is away from the residence or location at which the FAP 106 is located must continue to be away from the FAP 106. As such, if the RF network sweep will take a longer amount of time, the time vector can be lengthened and if the RF network sweep will take a shorter amount of time, the time vector can be shortened.

A determination can be made as to whether the mobile device is within the geographic region defined by the time vector. Average call duration for the mobile device and the estimated travel time to arrive back at the FAP 106 can be determined (using an estimated travel speed).

A comparison of the time of arrival can be made with the time to complete the FAP 106 RF network sweep to determine if the mobile device is likely to arrive back at or near the FAP 106 before the RF network sweep is completed.

If a determination is made that the mobile device is likely to arrive back at or near the FAP 106 before the RF network sweep is completed, the controller 102 can block the use of the FAP 106 for the RF network sweep. If a determination is made that the mobile device is not likely to arrive back at or near the FAP 106 before the RF network sweep is completed, the controller 102 can authorize the use of the FAP 106 for the RF network sweep. The controller 102 can authorize or block the use of the FAP 106 dynamically as conditions change with the mobile devices on the white list for the FAP 106.

If the mobile device cannot be located, the FAP allocation component 104 can analyze the history of usage by the mobile device to determine likelihood that the mobile device will pop-up in an area covered by the FAP 106 and access the FAP 106. The history of usage information can be stored as 602 at data storage 308'. The history of usage for a mobile device can be compared with the time of day, week or month that an RF network sweep is desired to be performed. If the time of day, week or month for the network sweep corresponds to or overlaps with the time of day, week or month that the mobile device typically accesses the FAP 106', the controller 102 can block the use of the FAP 106'. Similarly, if the time of day, week or month for the network sweep corresponds to or overlaps with the time of day, week or month that the mobile device does not typically access the FAP 106', the controller 102 can block the use of the FAP 106'.

FIGS. 7-12 illustrate example flowcharts of methods that facilitate utilizing an FAP for RF network sweeps. FIG. 13 illustrates an example of a method that facilitates delineation of networks for determination of a cause of impairment in FAP service.

For simplicity of explanation, the methodologies are depicted and described as a series of acts. It is to be understood and appreciated that the embodiments is not limited by the acts illustrated and/or by the order of acts, for example acts can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed herein are capable of being stored on an article of manufacture to facilitate transporting and transferring such methodologies to computers.

Figure 7:
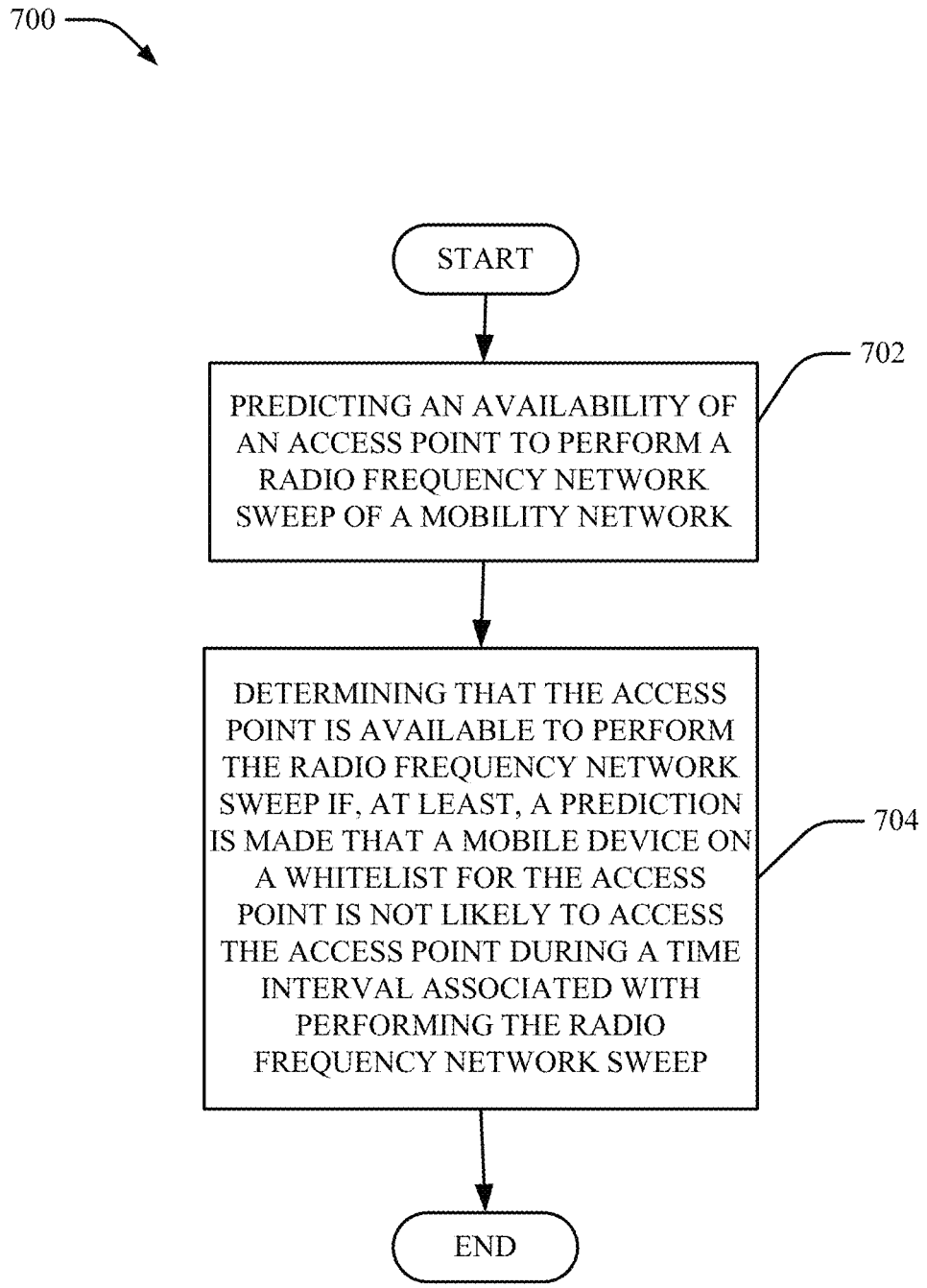
FIGS. 7-12 illustrate example flowcharts of methods that facilitate utilizing an FAP for RF network sweeps.

Turning first to FIG. 7, at 702, method 700 can include predicting an availability of an AP to perform an RF network sweep. At 704, method 700 can include determining that the AP is available to perform the RF network sweep if, at least, a prediction is made that a mobile device on a white list for the AP is not likely to access the AP during a time interval associated with performing the RF network sweep. For example, a time interval for performing an RF network sweep can be a designated time period (e.g., one hour, 30 minutes, four hours). In some embodiments, as described herein, the AP can be an FAP.

Predicting the availability of the AP to perform the RF network sweep can include determining a likelihood of the mobile device on the white list accessing the AP during the time interval associated with performing the RF network sweep. In various embodiments, the white list of the AP can include one or more mobile devices authorized to access the AP. As such, accessing the white list for the AP can provide information regarding which mobile devices may attempt to access the AP if the AP is scheduled to perform an RF network sweep. Accordingly, to reduce the chances that the mobile devices will attempt to access the AP and the AP is busy performing an RF network sweep, the likelihood of a mobile device on the white list accessing the AP can be determined.

The prediction of the availability of the AP can be based, at least, on the determining the likelihood of the mobile device on the white list accessing the AP during the time interval associated with performing the RF network sweep. For example, in various embodiments, if the mobile device is currently accessing the AP when the determination is being made, the likelihood can be determined to be greater than the selected threshold. In some embodiments, the likelihood can be based, at least, on whether the mobile device is located within a selected geographic proximity to the AP. If the mobile device is within a selected geographic proximity to the AP and/or if there is a particular likelihood that the mobile device will move into the selected geographic proximity, during the time interval for the RF network sweep, the likelihood of the mobile device accessing the AP can be determined to be greater than the selected threshold.

In some embodiments, information can be transmitted to a controller of the AP based on a determination that the AP is available to perform the RF network sweep. The transmission to the controller can include information commanding the controller transmitting a command to the AP to perform the RF network sweep.

Figure 8:
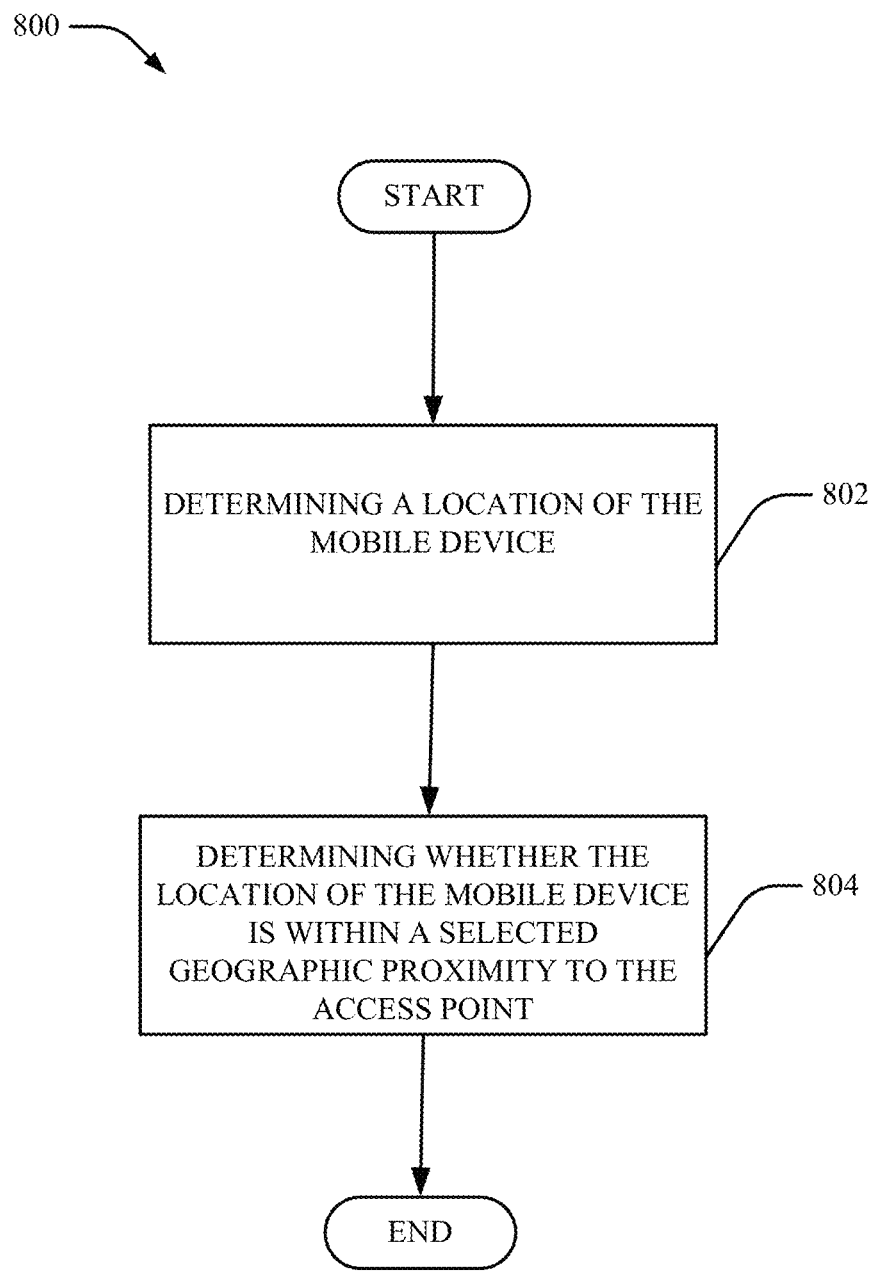

Turning to FIG. 8, predicting the availability of the AP to perform the RF network sweep can be performed, in some embodiments, as follows. At 802, method 800 can include determining a location of the mobile device. At 804, method 800 can include determining whether the location of the mobile device is within a selected geographic proximity to the AP. If the mobile device is within a geographic proximity to the AP, a prediction can be made that the mobile device is likely to attempt to access the AP, and the AP can be blocked and not employed for RF network sweeps.

Figure 9:
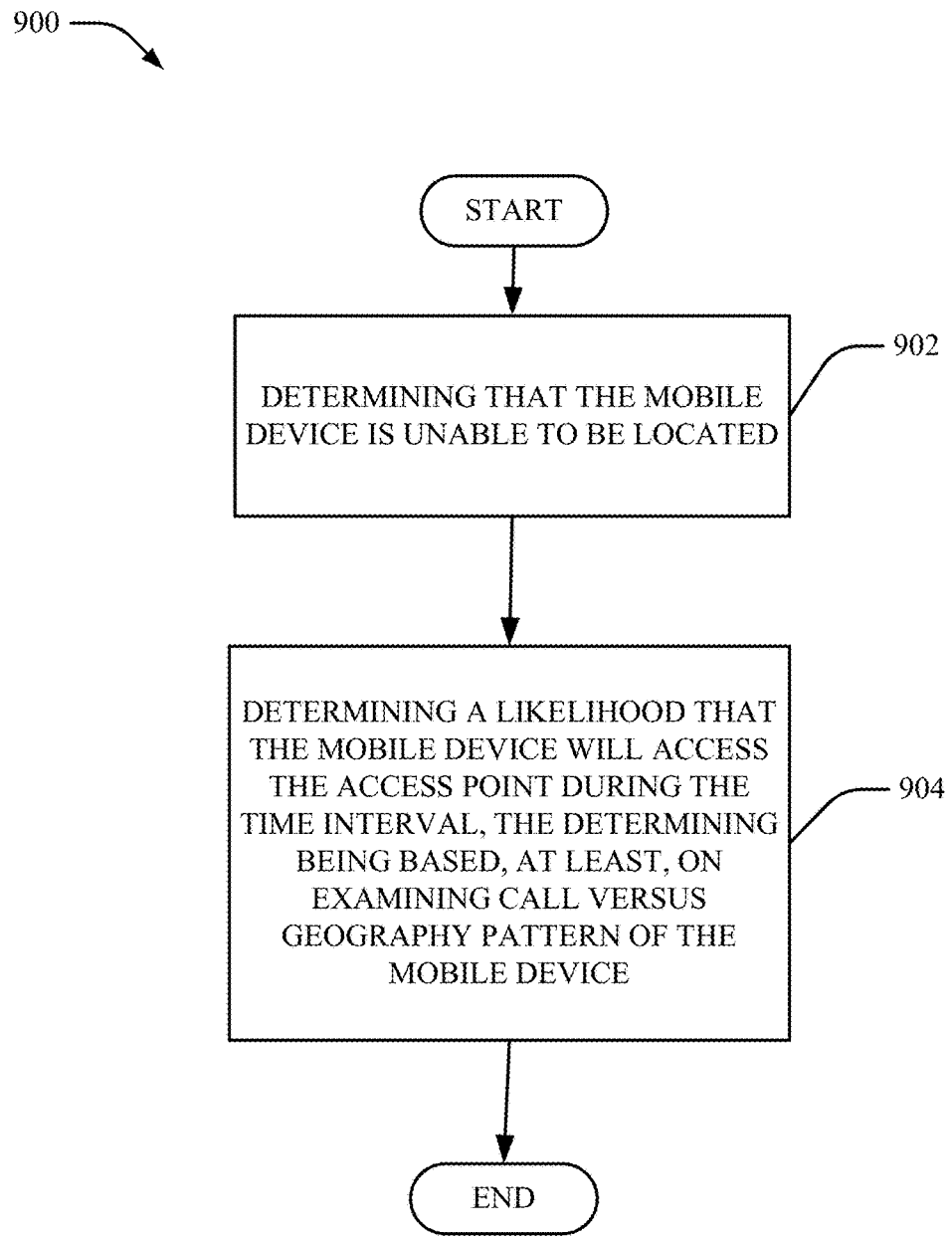

Turning now to FIG. 9, predicting the availability of the AP to perform the RF network sweep can be performed, in some embodiments, as follows. At 902, method 900 can include determining whether the mobile device is unable to be located. For example, the mobile device may be unable to be located because the mobile device is offline and/or due to RF conditions.

At 904, method 900 can include determining a likelihood that the mobile device will access the AP during the time interval for performing the RF network sweep. The determination can be based, at least, on examining the mobile device call versus geography pattern of the mobile device. In some embodiments, the mobile device call versus geography pattern can include information indicative of geographical locations of the mobile device during calls at selected time periods. In some embodiments, the call versus geography pattern can include information indicative of a public cell site that the mobile device is currently accessing, as discussed with reference to FIG. 11 below. In some embodiments, the call versus geography pattern can include information indicative of whether the mobile device is in a geographic region defined as a function of time vector determined based on the RF network sweep to be performed, as discussed with reference to FIG. 12 below.

Figure 10:
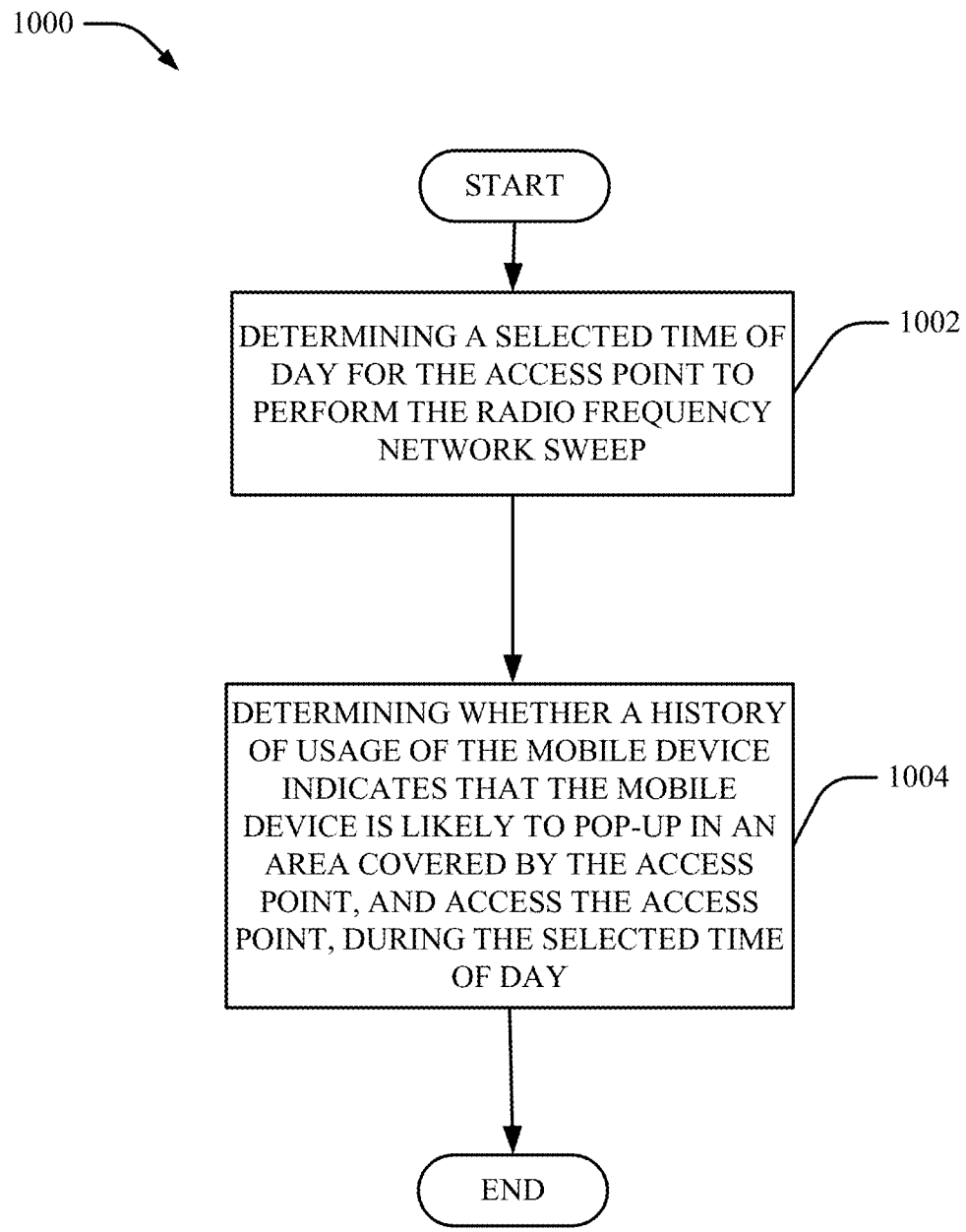

Turning now to FIG. 10, predicting the availability of the AP to perform the RF network sweep can be performed, in some embodiments, as follows. At 1002, method 1000 can include determining a selected time of day for the AP to perform the RF network sweep. At 1004, method 1000 can include determining whether a history of usage of the mobile device at the AP indicates that the mobile device is likely to pop-up in an area covered by the AP and access the AP during the selected time of day. The determination can be based, at least, on the history of usage of the mobile device at the AP. By way of example, but not limitation, the history of usage can include information such as the time of day, week and/or month that the mobile device has access the AP, mobile device call durations, the geographic location from which the mobile device typically makes calls, and/or the history of a mobile device moving frequently between being connected to a public cell site for the AP and the AP within a particular time duration (e.g., the mobile device moving between the public cell site and the AP within a short time period, such as 10 minutes, for example).

Figure 11:
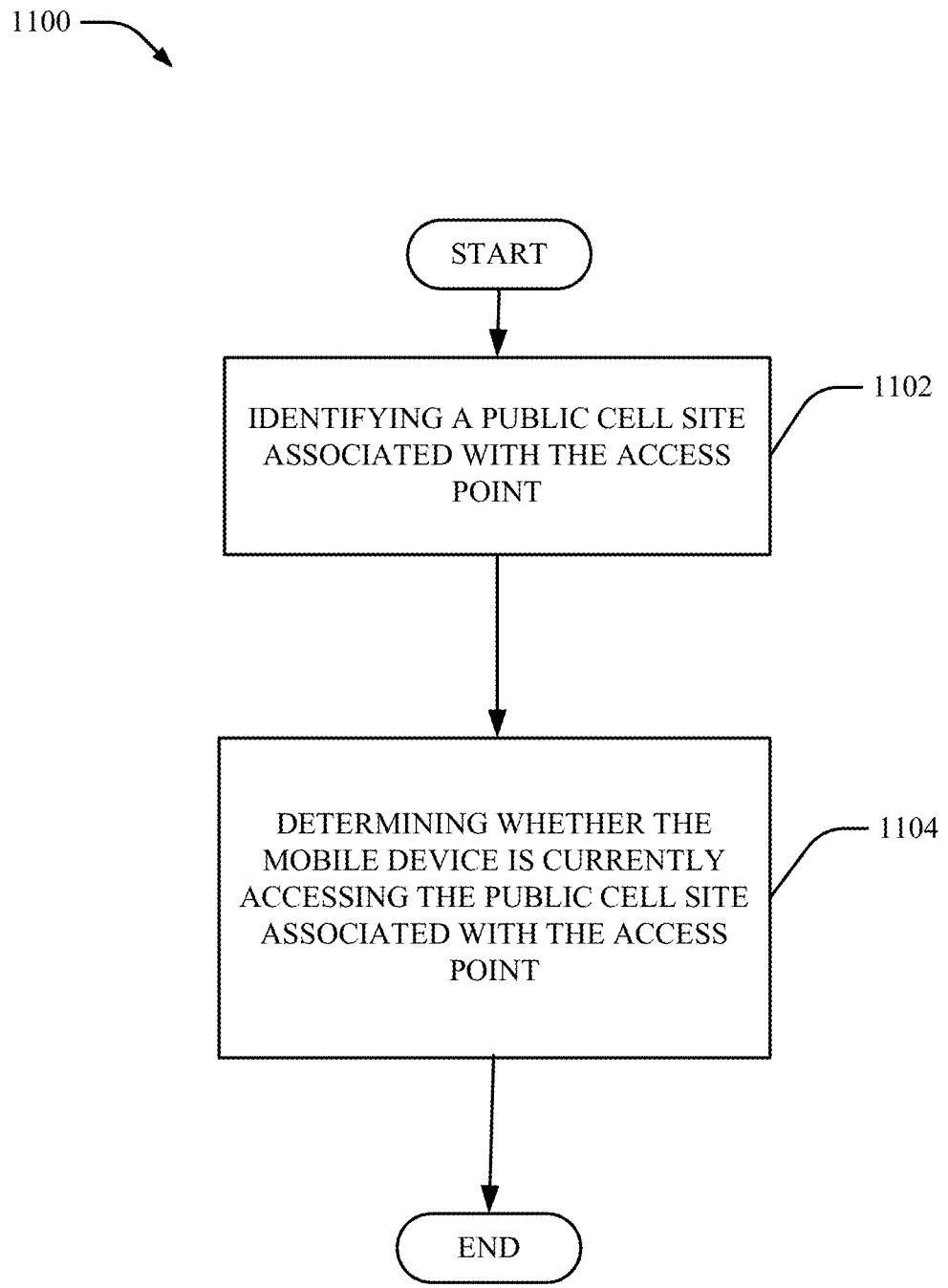

Turning now to FIG. 11, predicting the availability of the AP to perform the RF network sweep can be performed, in some embodiments, as follows. At 1102, method 1100 can include identifying a public cell site associate with the AP. For example, the public cell site associated with the AP can be the public cell site for the geographic area in which the AP is located.

At 1104, method 1100 can include determining whether the mobile device is currently accessing the public cell site associated with the AP. For example, if the mobile device is accessing the public cell site associated with the AP, the likelihood of the mobile device accessing the AP can be greater than the likelihood if the mobile device is not accessing the public cell site associated with the AP because the mobile device may be in close geographic proximity to the AP. As such, the mobile device can pop-up on the AP with greater likelihood than if the mobile device is not accessing the public cell site associated with the AP. For example, if a user of the mobile device walks out of a residence covered by the AP and begins to utilize the public cell site, the likelihood that the user will walk back into the residence and begin using the AP is greater than if the mobile device is at a distance from the public cell site and therefore is not utilizing the public cell site associated with the AP.

Figure 12:
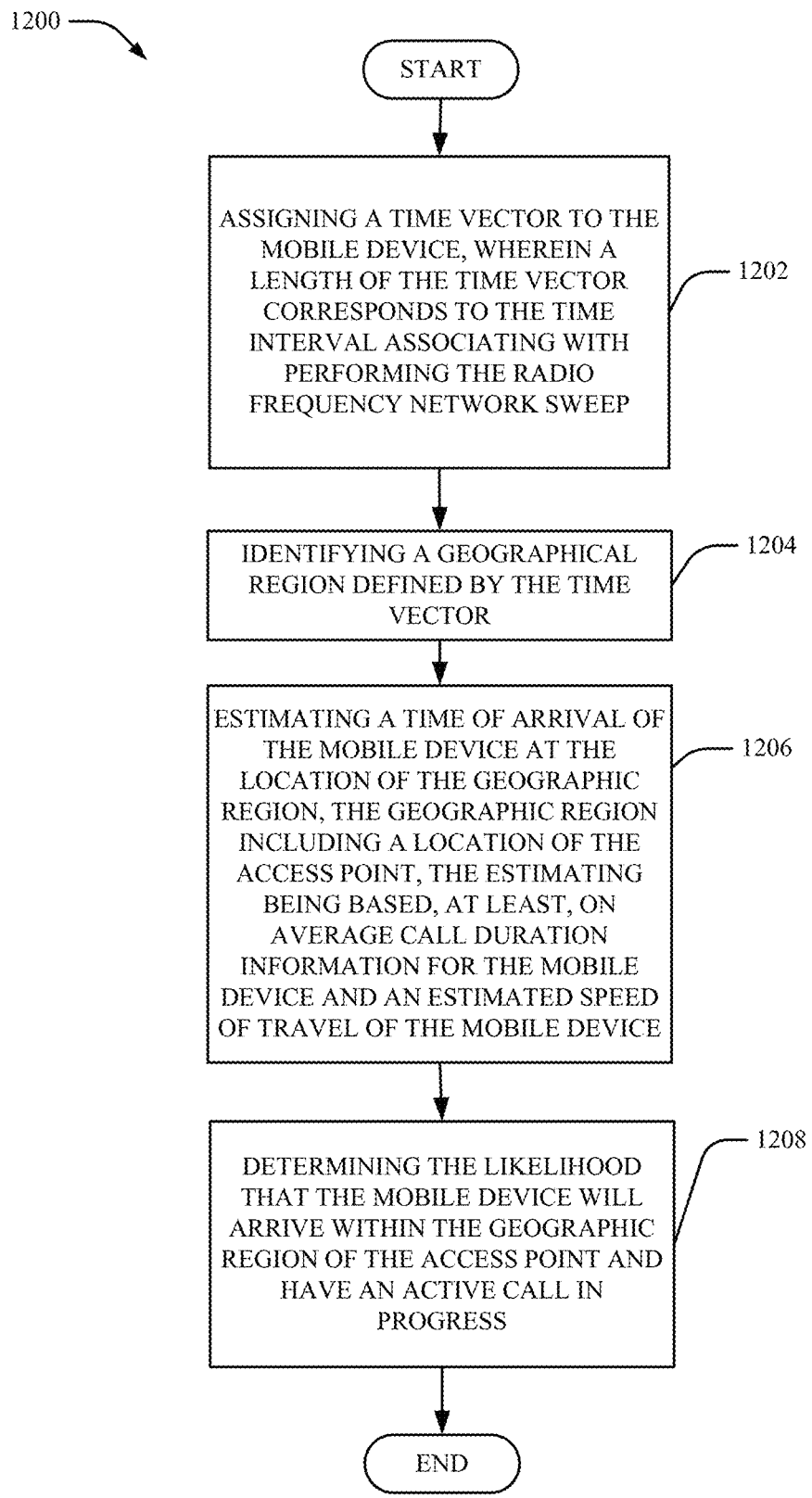
Figure 13:
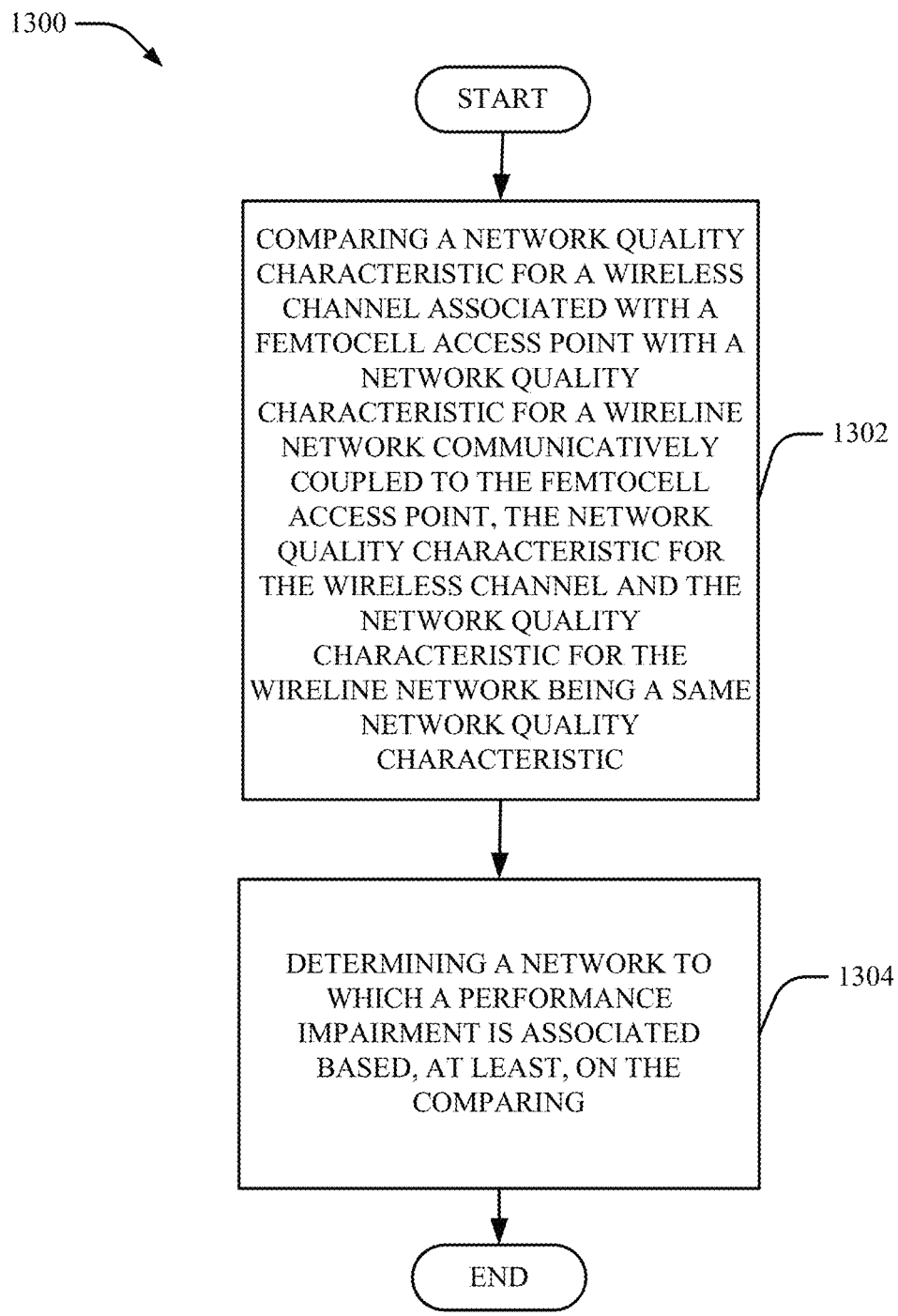
FIG. 13 illustrates an example flowchart of a method that facilitates delineation of networks for determination of a cause of impairment in FAP service.

Turning now to FIG. 12, predicting the availability of the AP to perform the RF network sweep can be performed, in some embodiments, as follows. At 1202, method 1200 can include assigning a time vector to the mobile device. The length of the time vector can correspond to the time interval associating with performing the RF network sweep. For example, if the time to perform the RF network sweep is short, the time vector can be short while, if the time to perform the RF network sweep is long, the time vector can be long to allow more time to perform the RF network sweep.

At 1204, method 1200 can include identifying a geographical region defined by the time vector. In some embodiments, the geographical region can be a circle having a radius approximately equivalent in length to the time vector. The geographic region can be a region around the AP within which the mobile device will access the AP if the mobile device has a call in progress.

At 1206, method 1200 can include estimating a time of arrival of the mobile device at the location of the geographic region, the geographic region including a location of the AP, the estimating being based, at least, on average call duration information for the mobile device and an estimated speed of travel of the mobile device.

At 1208, method 1200 can include determining the likelihood that the mobile device will arrive within the geographic region of the AP and have an active call in progress. The likelihood can be determined based on the average call duration information and the estimated speed of travel of the mobile device when compared with the current location of the mobile device, the amount of time that the current call has been in progress.

FIG. 13 illustrates an example of a method that facilitates delineation of networks for determination of a cause of impairment in FAP service. At 1302, method 1300 can include comparing a network quality characteristic for a wireless channel associated with an FAP with a network quality characteristic for a wired network communicatively coupled to the FAP. The wired network can be a network to which the FAP is assigned, for example. In some embodiments, the network quality characteristic for the wireless channel and the network quality characteristic for the wired network can be the same network quality characteristic. By way of example, but not limitation, the network quality characteristics can include network latency, packet loss, FEC delay (e.g., the time that it takes to do the proper FEC), unavailable seconds (e.g., the period of time during which there is no communication with the FAP) and/or a time and/or frequency associated with the FAP being unreachable. In various embodiments, the characteristics can be measured for the wired network on which the FAP wireless network, and wired network to which the AP is associated. By way of example, but not limitation, one or more of the same characteristics can be measured for the broadband landline network associated with the FAP, the household/business network served by the FAP and/or the RF network communicatively coupled to mobile devices (e.g., the mobile devices on the white list of the FAP).

At 1304, method 1300 can include determining a network to which performance impairment is associated based, at least, on the comparing in 1302. The method can determine whether a problem is associated with the wired network or the wireless channel in various embodiments. For example, the performance of the broadband landline network supporting the femtocell can be correlated with the RF network performance to allow for better delineation of the root cause of one or more impairments to user service provided by the FAP.

Depending on the broadband network, for example, although not shown, the method can include distinguishing between whether a known problem is associated with the FAP or the landline network. For example, a problem could be associated with an RL from the FAP or with the local area network (LAN). As another example, the method can evaluate a characteristic such as network latency, for example, from a router or modem associated with a landline network. The method can include determination of the source of the problem (e.g., wired network or wireless network). As such, impairments can be more efficiently addressed.

In some embodiments, although not shown, method 1300 can also include predicting an availability of the FAP to perform a RF network sweep. The prediction can be performed including one or more of the methods 700, 800, 900, 1000, 1100, 1200 and/or 1300.

The FAP can then be used to perform the RF network sweep based, at least, on a prediction that the FAP is available to perform the RF network sweep. The method can also include obtaining the network quality characteristic for the wireless channel based, at least, on the RF network sweep.

The systems and methods disclosed and claimed herein can be employed in telecommunications systems or by telecommunications companies that offer macrocell, femtocell and/or microcell service. In various embodiments, the systems and methods can be employed by equipment and system vendors to the telecommunications industry as part of a product bundle. Further, while the embodiments described herein can be facilitated through the use of FAPs, in various embodiments, the embodiments can also be facilitated employing picocells, microcells and/or macrocells. All such embodiments are envisaged.

Figure 14:
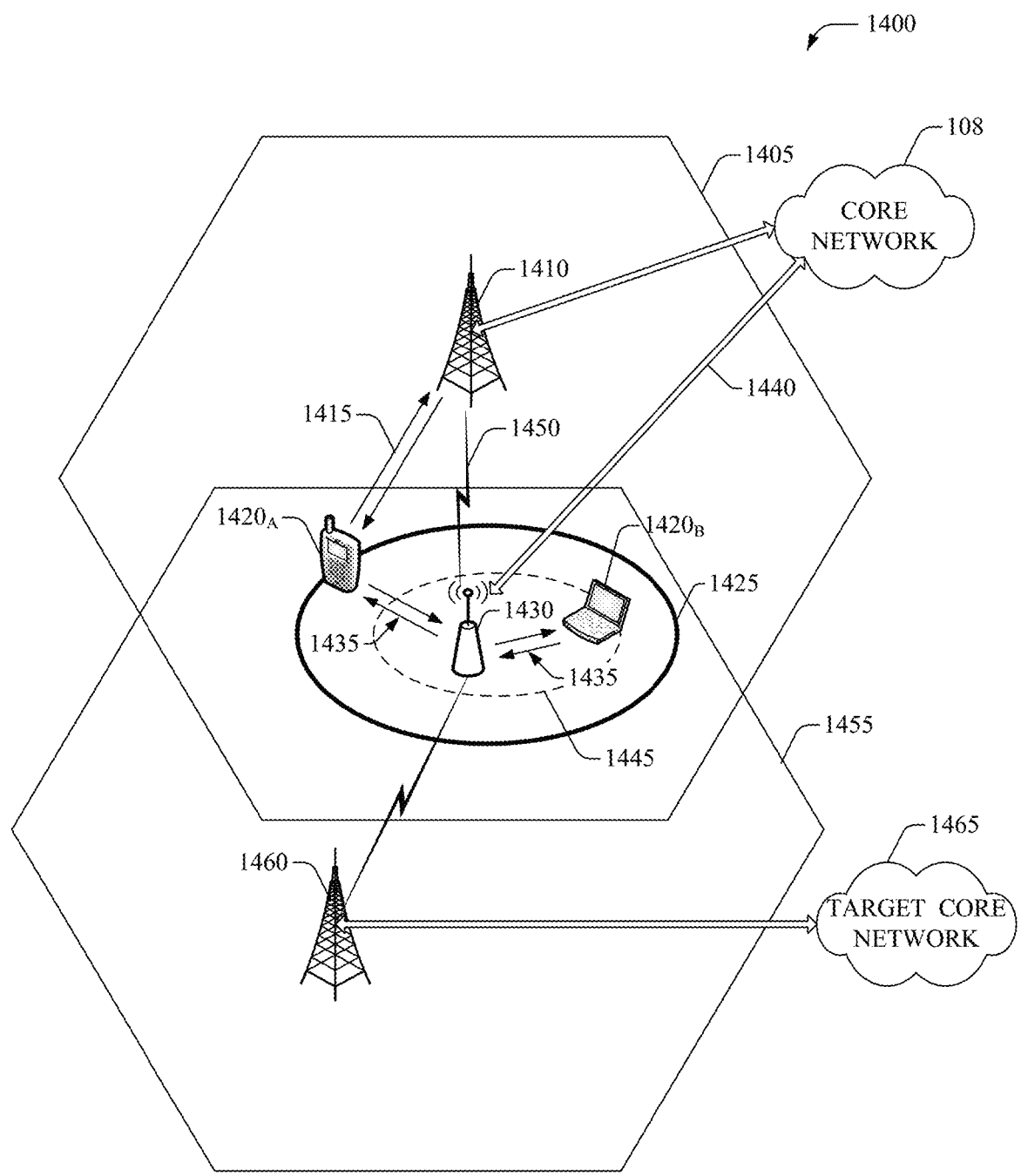
FIG. 14 illustrates an example wireless communication environment with associated components that facilitate utilizing an FAP for RF network sweeps.

FIG. 14 illustrates an example wireless communication environment with associated components that facilitate utilizing an FAP for RF network sweeps. In wireless environment 1400, 1405 and 1455 can represent coverage macrocells, which can be served by base stations 1410 and 1460 (e.g., coupled to a target core network 1465 that can be operated by an acquired service provider), respectively. Macrocell coverage can be generally intended for outdoors locations for servicing mobile devices (e.g., user equipment (UE) $1420_A$), and such coverage can be achieved via a wireless link 1415. In an embodiment, UE 1420 can be a 3GPP UMTS mobile phone.

Within macrocell coverage cell 1405, a femtocell 1445, served by a FAP 1430, can be deployed. A femtocell typically can cover an area 1425 that can be determined, at least in part, by transmission power allocated to FAP 1430, path loss, shadowing, and so forth. Coverage area typically can be spanned by a coverage radius that ranges from 20 to 50 meters. Confined coverage area 1445 can be generally associated with an indoors area or a building, which can span about 5000 sq. ft. Generally, FAP 1430 typically can service a number (e.g., a few or more) wireless devices (e.g., subscriber station $1420_B$) within confined coverage area 1445. In an embodiment, FAP 1430 can integrate seamlessly with substantially any packet-switched (PS)-based and circuit-switched (CS)-based network; for instance, FAP 1430 can integrate into an existing 3GPP Core via conventional interfaces like Iu-CS, Iu-PS, Gi and/or Gn interfaces. In another embodiment, FAP 1430 can exploit high-speed downlink packet access in order to accomplish substantive bitrates. In yet another embodiment, FAP 1430 has a location area code (LAC) and/or routing area code (RAC) that can be different from the underlying macrocell network. These LAC and RAC can be used to identify subscriber station location for a variety of reasons, most notably to direct incoming voice and data traffic to appropriate paging transmitters.

As a subscriber station, e.g., UE $1420_A$, can leave macrocell coverage (e.g., cell 1405) and enters femtocell coverage (e.g., area 1425), as illustrated in environment 1400. A carrier frequency scan can be triggered by the UE $1420_A$, which can detect the FAP 1430. UE $1420_A$ can attempt to attach to the FAP 1430 through transmission and reception of attachment signaling, effected via a forward link (FL)/reverse link (RL) 1435; in an embodiment, the attachment signaling can include a Location Area Update (LAU) and/or Routing Area Update (RAU). Attachment attempts can be a part of procedures to ensure mobility, so voice calls and sessions can continue even after a macrocell-to-femtocell transition or vice versa. It is noted that UE 1420 can be employed seamlessly after either of the foregoing transitions. Femtocell networks are also designed to serve stationary or slow-moving traffic with reduced signaling loads compared to macrocell networks. A femtocell service provider (e.g., an entity that commercializes, deploys, and/or utilizes FAP 1430) therefore can be inclined to minimize unnecessary LAU/RAU signaling activity at substantially any opportunity to do so, and through substantially any available means. It is noted that substantially any mitigation of unnecessary attachment signaling/control can be advantageous for femtocell operation. Conversely, if not successful, UE 1420 generally can be commanded (through a variety of communication means) to select another LAC/RAC or enter "emergency calls only" mode. It can be appreciated that this attempt and handling process can occupy significant UE battery, and FAP capacity and signaling resources as well.

When an attachment attempt is successful, UE 1420 can be allowed on femtocell 1425 and incoming voice and data traffic can be paged and routed to the subscriber station through the FAP 1430. Data traffic can be routed through a backhaul broadband wired network backbone 1440 (e.g., optical fiber backbone, twisted-pair line, T1/E1 phone line, DSL or coaxial cable). In some embodiments, an FAP 1430 can rely on a backhaul network backbone 1440 for routing and paging, and for packet communication, substantially any quality of service can handle heterogeneous packetized traffic. Namely, packet flows established for wireless communication devices (e.g., terminals $1420_A$ and $1420_B$) served by FAP 1430, and for devices served through the backhaul network pipe 1440. To improve the likelihood of positive subscriber experience or perception, FAP 1430 can maintain a high level of throughput for traffic (e.g., voice and data) utilized on a mobile device for one or more subscribers while in the presence of external, additional packetized or broadband, traffic associated with applications (e.g., web browsing, data transfer (e.g., content upload), and the like) executed in devices within the femtocell coverage area (e.g., area 1425 or area 1445).

Figure 15:
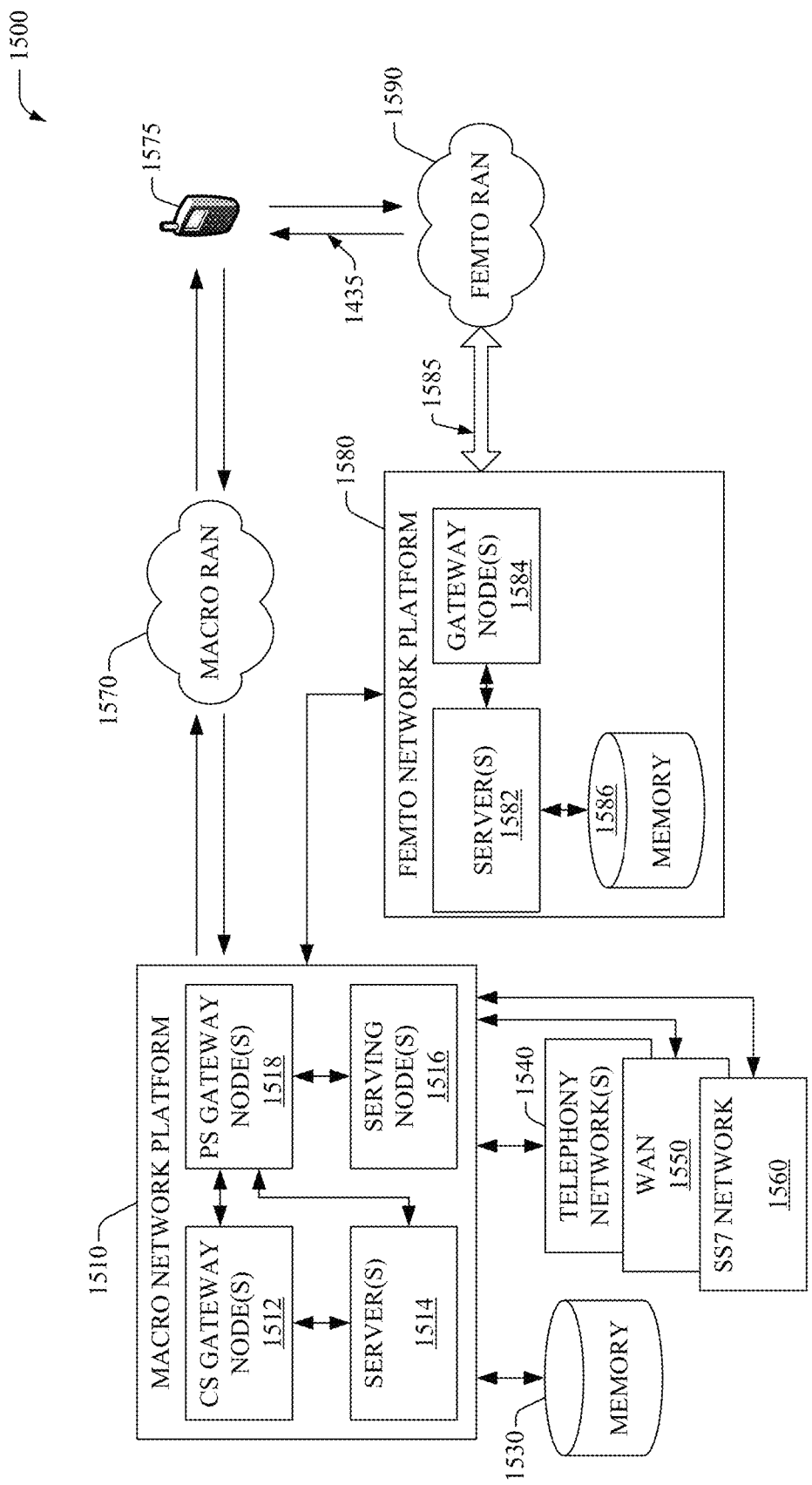
FIG. 15 illustrates a schematic deployment of a macrocell and a femtocell to facilitate utilizing an FAP for RF network sweeps.
Figure 16:
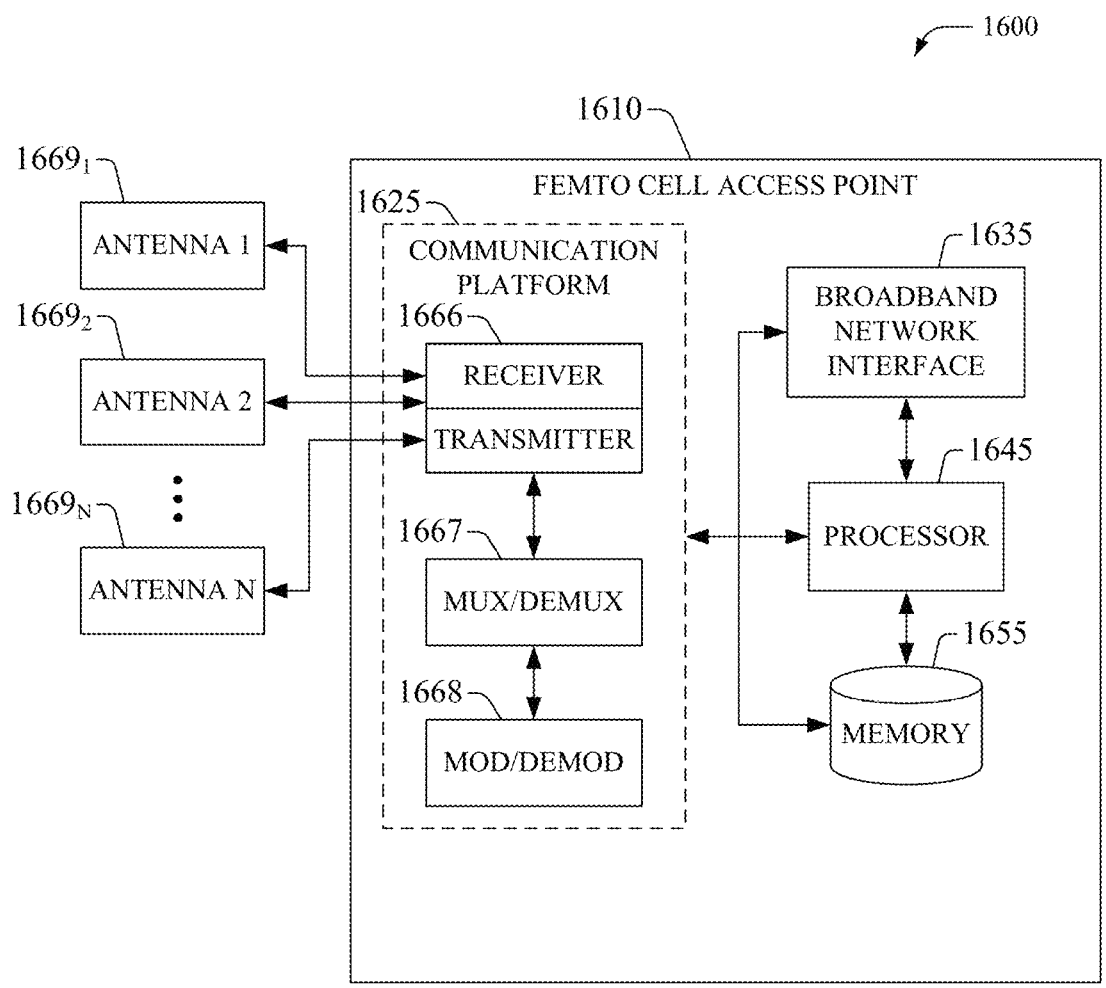
FIG. 16 illustrates another example embodiment of an FAP that can be utilized for RF network sweeps.

To provide further context for various embodiments of embodiments described herein, FIGS. 15 and 16 illustrate an example wireless communication environment 1500, with associated components for operation of a femtocell, and a block diagram of an example embodiment 1600 of a FAP, which can facilitate utilizing an FAP for RF network sweeps.

Wireless communication environment 1500 includes two wireless network platforms: (i) A macrocell network platform 1510 that serves or facilitates communication) with user equipment 1575 via a macrocell radio access network (RAN) 1570. It should be appreciated that in cellular wireless technologies (e.g., 3GPP UMTS, high speed packet access (HSPA), 3GPP LTE, 3GPP ultra mobile broadband (UMB)), macrocell network platform 1510 can be embodied in a Core Network. (ii) A femtocell network platform 1580, which can provide communication with UE 1575 through a femtocell RAN 1590 linked to the femtocell network platform 1580 via backhaul pipe(s) 1585, wherein backhaul pipe(s) are substantially the same a backhaul link 1440. It should be appreciated that femtocell network platform 1580 typically offloads UE 1575 from macrocell network, once UE 1575 attaches (e.g., through macro-to-femtocell handover or via a scan of channel resources in idle mode) to femtocell RAN.

A RAN can include one or more base stations or APs, and its associated electronic circuitry and deployment cell site(s), in addition to a wireless radio link operated in accordance with the base station(s). Accordingly, macrocell RAN 1570 can comprise various coverage cells like cell 1105, while femtocell RAN 1590 can comprise multiple FAPs. As mentioned above, deployment density in femtocell RAN 1590 can be substantially higher than in macrocell RAN 1570.

Generally, both macrocell and femtocell network platforms 1510 and 1580 can include components, e.g., nodes, gateways, interfaces, servers or platforms, that facilitate both PS and CS traffic (e.g., voice and data) and control generation for networked wireless communication. For example, macrocell network platform 1510 includes CS gateway node(s) 1512 which can interface CS traffic received from legacy networks like telephony network(s) 1540 (e.g., public switched telephone network (PSTN) or public land mobile network (PLMN)) or a SS7 network 1560. Moreover, CS gateway node(s) 1512 interfaces CS-based traffic and signaling and gateway node(s) 1518.

In addition to receiving and processing CS-switched traffic and signaling, gateway node(s) 1518 can authorize and authenticate PS-based data sessions with served (e.g., through macrocell RAN) wireless devices. Data sessions can include traffic exchange with networks external to the macrocell network platform 1510, like wide area network(s) (WANs) 1550; it should be appreciated that local area network(s) (LANs) can also be interfaced with macrocell network platform 1510 through gateway node(s) 1518. Gateway node(s) 1518 can generate packet data contexts when a data session is established. It should be further appreciated that the packetized communication can include multiple flows that can be generated through server(s) 1514. Macrocell network platform 1510 also includes serving node(s) 1516 that convey the various packetized flows of information or data streams, received through gateway node(s) 1518. Server(s) 1514 can include one or more processor configured to confer at least in part the functionality of macrocell network platform 1510. To that end, the one or more processor can execute code instructions stored in memory 1530, for example.

In example wireless environment 1500, memory 1530 stores information related to operation of macrocell network platform 1510. Information can include business data associated with subscribers; market plans and strategies (e.g., promotional campaigns, business partnerships; operational data for mobile devices served through macrocell network platform; service and privacy policies; end-user service logs for law enforcement). Memory 1530 can also store information from at least one of telephony network(s) 1540, wide area network (WAN) 1550 or signaling system number 7 (SS7) network 1560.

Femtocell gateway node(s) 1584 have substantially the same functionality as PS gateway node(s) 1518. Additionally, femtocell gateway node(s) 1584 can also include substantially all functionality of serving node(s) 1516. In an embodiment, femtocell gateway node(s) 1584 facilitates handover resolution (e.g., assessment and execution). Server(s) 1582 have substantially the same functionality as described in connection with server(s) 1514 and can include one or more processors configured to confer at least in part the functionality of macrocell network platform 1510. Moreover, the analysis component 1514 can be implemented or executed by server(s) 1582 and/or server(s) 1514. To that end, the one or more processor can execute code instructions stored in memory 1586, for example.

Memory 1586 can include information relevant to operation of the various components of femtocell network platform 1580. For example operational information that can be stored in memory 1586 can comprise, but is not limited to, subscriber information; contracted services; maintenance and service records; femtocell configuration (e.g., devices served through femtocell RAN 1590; access control lists or white lists); service policies and specifications; privacy policies; add-on features; femtocell measurement data).

With respect to FIG. 16, in example embodiment 1600, FAP 1610 can receive and transmit signal(s) (e.g., traffic and control signals) from and to wireless devices, access terminals, wireless ports and routers, etc., through a set of antennas $1669_1$-$1669_N$. It should be appreciated that while antennas $1669_1$-$1669_N$ are a part of communication platform 1625, which comprises electronic components and associated circuitry that provides for processing and manipulating of received signal(s) (e.g., a packet flow) and signal(s) (e.g., a broadcast control channel) to be transmitted. In an embodiment, communication platform 1625 includes a transmitter/receiver (e.g., a transceiver) 1666 that can convert signal(s) from analog format to digital format upon reception, and from digital format to analog format upon transmission. In addition, receiver/transmitter 1666 can divide a single data stream into multiple, parallel data streams or perform the reciprocal operation. Coupled to transceiver 1666 is a multiplexer/demultiplexer 1667 that facilitates manipulation of signal in time and frequency space. Electronic component 1667 can multiplex information (data/traffic and control/signaling) according to various multiplexing schemes such as time division multiplexing (TDM), frequency division multiplexing (FDM) orthogonal frequency division multiplexing (OFDM), code division multiplexing (CDM), space division multiplexing (SDM). In addition, mux/demux component 1667 can scramble and spread information (e.g., codes) according to substantially any code known in the art; e.g., Hadamard-Walsh codes, Baker codes, Kasami codes, polyphase codes, and so on. A modulator/demodulator 1668 can be also a part of operational group 1625, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1610 also includes a processor 1645 configured to confer functionality, at least partially, to substantially any electronic component in the FAP 1610, in accordance with embodiments of the embodiments. In particular, processor 1645 can facilitate FAP 1610 to implement configuration instructions received through communication platform 1625, which can include storing data in memory 1655. In addition, processor 1645 facilitates FAP 1610 to process data (e.g., symbols, bits or chips) for multiplexing/demultiplexing, such as effecting direct and inverse fast Fourier transforms, selection of modulation rates, selection of data packet formats, inter-packet times, etc. Moreover, processor 1645 can manipulate antennas $1669_1$-$1669_N$ to facilitate beamforming or selective radiation pattern formation, which can benefit specific locations (e.g., basement, home office) covered by FAP; and exploit substantially any other advantages associated with smart-antenna technology. Memory 1655 can store data structures, code instructions, system or device information like device identification codes (e.g., International Mobile Subscriber Identity (IMSI), an International Mobile Equipment Identity (IMEI), a Mobile Station International Subscriber Directory Number (MSISDN) or a serial number) and specification such as multimode capabilities; code sequences for scrambling; spreading and pilot transmission, floor plan configuration, AP deployment and frequency plans; and so on. Moreover, memory 1655 can store configuration information such as schedules and policies; FAP address(es) or geographical indicator(s); access lists (e.g., white lists); license(s) for utilization of add-features for FAP 1610, and so forth. In one example, data storage 308 can be implemented in memory 1655.

In embodiment 1600, processor 1645 is coupled to the memory 1655 in order to store and retrieve information necessary to operate and/or confer functionality to communication platform 1625, broadband network interface 1635 (e.g., a broadband modem), and other operational components (e.g., multimode chipset(s), power supply sources) that support FAP 1610. The FAP 1610 can further include a measurement component 202, which can include functionality, including but not limited to performing RF network sweeps, as more fully described herein. In addition, various embodiments disclosed herein can also be implemented through (i) program modules stored in a computer-readable storage medium or memory (e.g., memory 1586 or memory 1655) and executed by a processor (e.g., processor 1645) and/or (ii) one or more other combinations of hardware and software or hardware and firmware.

Figure 17:
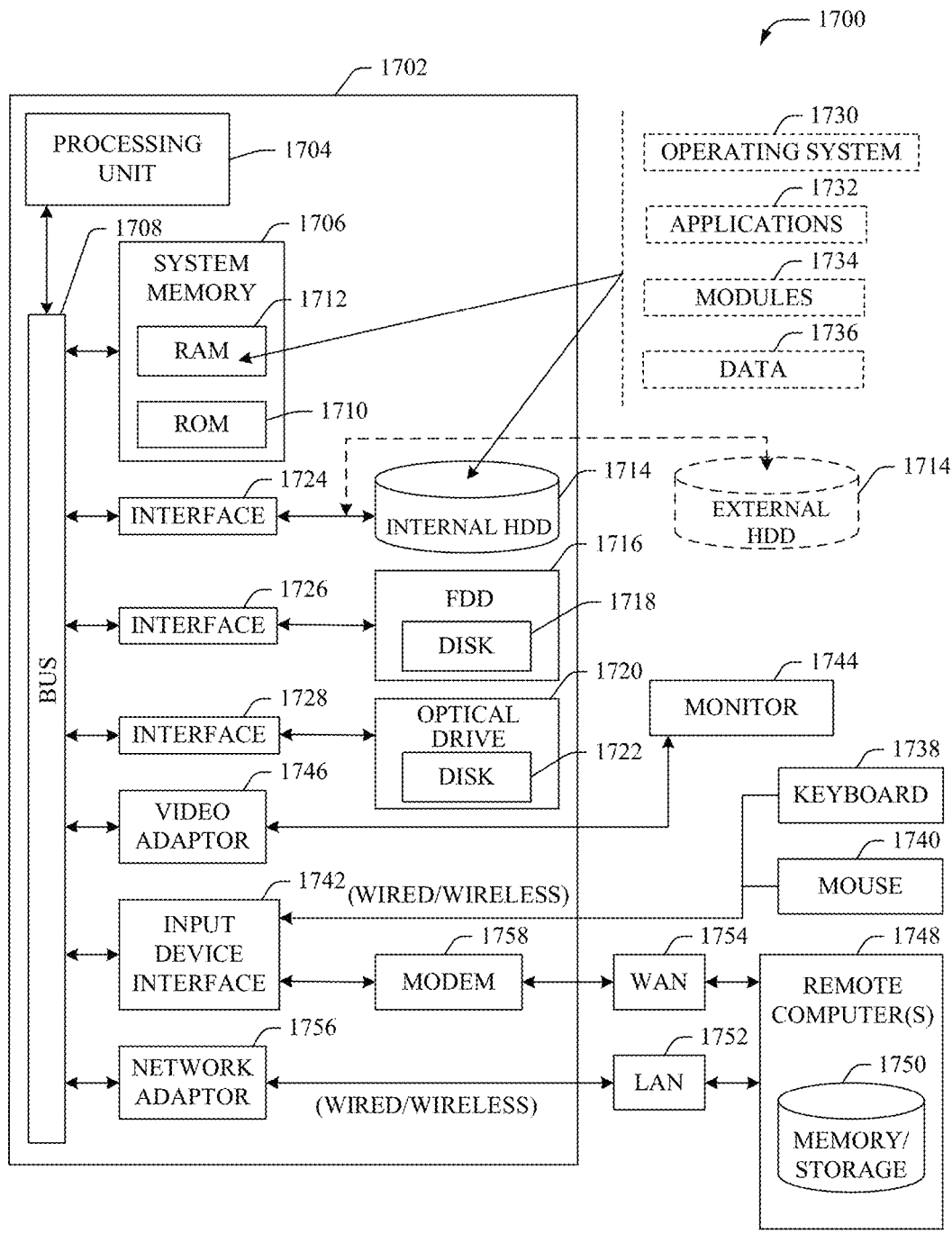
FIG. 17 illustrates a block diagram of a computer operable to facilitate utilizing an FAP for RF network sweeps.

Referring now to FIG. 17, there is illustrated a block diagram of a computer operable to facilitate utilizing an FAP for RF network sweeps. In order to provide additional context for various embodiments of the embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the embodiments includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory 1710 such as ROM, EPROM, EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) can include a microphone, an infrared (IR) remote control, a joystick, a game pad, a stylus pen, touch screen or the like. These and other input devices are often connected to the processing unit 1704 through an input device interface 1742 that can be coupled to the system bus 1708, but can be connected by other interfaces, such as a parallel port, an IEEE 1394 serial port, a game port, a universal serial bus (USB) port, an IR interface, etc.

A monitor 1744 or other type of display device can be also connected to the system bus 1708 via an interface, such as a video adapter 1746. In addition to the monitor 1744, a computer typically includes other peripheral output devices (not shown), such as speakers, printers, etc.

The computer 1702 can operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1752 through a wired and/or wireless communication network interface or adapter 1756. The adapter 1756 can facilitate wired or wireless communication to the LAN 1752, which can also include a wireless AP disposed thereon for communicating with the wireless adapter 1756.

When used in a WAN networking environment, the computer 1702 can include a modem 1758 or can be connected to a communications server on the WAN 1754 or has other means for establishing communications over the WAN 1754, such as by way of the Internet. The modem 1758, which can be internal or external and a wired or wireless device, can be connected to the system bus 1708 via the serial port interface 1742. In a networked environment, program modules depicted relative to the computer 1702 or portions thereof, can be stored in the remote memory/storage device 1750. It will be appreciated that the network connections shown are example and other means of establishing a communications link between the computers can be used.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and BLUETOOTH® wireless technologies. Thus, the communication can be a predefined structure as with a conventional network or simply an ad hoc communication between at least two devices.

Wireless Fidelity (Wi-Fi) can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The systems and/or methods described herein can employ artificial intelligence (AI) to facilitate automating one or more features in accordance with the embodiments. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc. The criteria can include, but is not limited to, historical patterns, UE behavior, user preferences, service provider preferences and/or policies, FAP parameters, location of the femtocell, location of the acquired cell sites, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the systems and methods is intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method, comprising:
  determining, by a device comprising a processor, a probability relating to whether a mobile device is likely to access an access point device during a time interval associated with performing a radio frequency network sweep, wherein the determining the probability comprises:
    determining a pattern of movement of the mobile device based on estimating a time of arrival of the mobile device at a location of a geographical region, and wherein the estimating is based on duration information representing a duration of a communication session associated with the mobile device; and
  transmitting, by the device, information to a controller of the access point device based on the probability.
2. The method of claim 1, wherein the estimating is further based on an estimated speed of travel of the mobile device.
3. The method of claim 1, further comprising determining, by the device, that the access point device is not available to perform the radio frequency network sweep in response to determining that the mobile device is likely to access the access point device during the time interval associated with performing the radio frequency network sweep.
4. The method of claim 1, wherein the information authorizes the controller to transmit a command to the access point device to perform the radio frequency network sweep.
5. The method of claim 1, wherein the access point device is a femtocell access point device.
6. The method of claim 1, wherein the location of the geographical region is a first location, and wherein the determining the probability further comprises:
  determining a second location of the mobile device, and
  determining whether the second location of the mobile device is within a defined geographic proximity to the access point device.
7. The method of claim 1, wherein the determining the probability further comprises:
  determining a time of day for the access point device to perform the radio frequency network sweep.
8. The method of claim 7, wherein the determining the probability further comprises:
  determining whether data representing a history of usage of the access point device by the mobile device indicates that the mobile device will be present in an area covered by the access point device and access the access point device during a selected time of day.
9. The method of claim 1, wherein the determining the probability further comprises:
  identifying a public cell site device associated with the access point device; and
  determining whether the mobile device is currently accessing the public cell site device associated with the access point device.
10. The method of claim 1, wherein the determining the probability further comprises:
  determining that the mobile device is unable to be located.
11. The method of claim 1, wherein the determining the pattern of movement further comprises:
  determining a likelihood that the mobile device will arrive within the geographical region during an active communication session in progress with the mobile device.

12. A system, comprising:
a processor; and
a memory that stores executable instructions that, when executed by the processor, facilitate performance of operations, comprising:
determining a probability relating to whether a mobile device will access an access point device during a time interval associated with performing a radio frequency network sweep, wherein the determining the probability comprises:
determining a pattern of movement of the mobile device based on estimating a time of arrival of the mobile device at a location of a geographical region, and wherein the estimating is based on duration information representing a duration of a communication associated with the mobile device, and
transmitting information to a controller of the access point device based on the probability.

13. The system of claim 12, wherein the operations further comprise determining that the access point device is not available to perform the radio frequency network sweep in response to alternatively determining that the mobile device is likely to access the access point device during the time interval associated with performing the radio frequency network sweep.

14. The system of claim 12, wherein the information authorizes the controller to transmit a command to the access point device to perform the radio frequency network sweep.

15. The system of claim 12, wherein the access point device is a femtocell access point device.

16. The system of claim 12, wherein the location of the geographical region is a first location, and wherein the determining the probability further comprises:
determining a second location of the mobile device, and
determining whether the second location of the mobile device is within a defined geographic proximity to the access point device.

17. A non-transitory machine-readable storage medium, comprising executable instructions that, when executed by a processor, facilitate performance of operations, comprising:
determining a probability associated with whether a mobile device is likely to access an access point device during a time interval associated with performing a radio frequency network sweep, wherein the determining the probability comprises:
determining a pattern of movement of movement of the mobile device based on estimating a time of arrival of the mobile device at a location of a geographical region, and wherein the estimating is based on duration information representing a duration of a communication session associated with the mobile device, and
transmitting, by the device, information to a controller of the access point device based on the probability.

18. The non-transitory machine-readable storage medium of claim 17, wherein the determining the probability further comprises:
determining whether data representing a history of usage of the access point device by the mobile device indicates that the mobile device is likely to be present in an area covered by the access point device and access the access point device during a selected time of day.

19. The non-transitory machine-readable storage medium of claim 17, wherein the determining the probability further comprises:
identifying a public cell site device associated with the access point device, and
determining whether the mobile device is currently accessing the public cell site device associated with the access point device.

20. The non-transitory machine-readable storage medium of claim 17, wherein the determining the probability further comprises:
determining that the mobile device is unable to be located.

* * * * *